United States Patent
Berglund et al.

(10) Patent No.: US 10,560,163 B2
(45) Date of Patent: Feb. 11, 2020

(54) BEAMFORMING CONFIGURATION WITH ADAPTIVE PORT-TO-ANTENNA MAPPING FOR A MULTI-ANTENNA SYSTEM

(71) Applicant: Telefonaktiebolaget LM Ericsson (publ), Stockholm (SE)

(72) Inventors: Joel Berglund, Linköping (SE); Mirsad Cirkic, Linköping (SE); Erik Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/536,059

(22) PCT Filed: Dec. 19, 2014

(86) PCT No.: PCT/SE2014/051545
§ 371 (c)(1),
(2) Date: Jun. 14, 2017

(87) PCT Pub. No.: WO2016/099360
PCT Pub. Date: Jun. 23, 2016

(65) Prior Publication Data
US 2017/0338875 A1 Nov. 23, 2017

(51) Int. Cl.
*H04B 7/06* (2006.01)
*H04B 7/0456* (2017.01)
(52) U.S. Cl.
CPC ........ *H04B 7/0617* (2013.01); *H04B 7/0456* (2013.01); *H04B 7/0626* (2013.01)
(58) Field of Classification Search
CPC .. H04B 7/0413; H04B 7/0617; H04B 7/0456; H04B 7/0417; H04L 5/0007
See application file for complete search history.

(56) References Cited

U.S. PATENT DOCUMENTS

| | | |
|---|---|---|
| 2011/0280188 A1 | 11/2011 | Jeon et al. |
| 2013/0194943 A1 | 8/2013 | Davydov et al. |

(Continued)

FOREIGN PATENT DOCUMENTS

| | | |
|---|---|---|
| WO | 2013133645 A1 | 9/2013 |
| WO | 2013144361 A1 | 10/2013 |

OTHER PUBLICATIONS

3GPP, "3rd Generation Partnership Project; Technical Specification Group Radio Access Network; Evolved UMTS Terrestrial Radio Access; Physical Channels and Modulation (Release x)", 3GPP TS 36.211 V0.0.0, Sep. 2006, 1-12.

(Continued)

*Primary Examiner* — Shuwang Liu
*Assistant Examiner* — Gina M McKie
(74) *Attorney, Agent, or Firm* — Sage Patent Group

(57) ABSTRACT

There is provided a method and corresponding apparatus for determining a beamforming configuration for a multi-antenna system according to an embodiment. In general, the multi-antenna system has at least two antennas and a port-to-antenna mapping between antenna ports and antennas. The method comprises obtaining (S1) first feedback information originating from a wireless device relating to a multi-antenna transmission based on a first beamforming configuration including a first port-to-antenna mapping, and obtaining (S2) second feedback information originating from the wireless device relating to a multi-antenna transmission based on a second, different beamforming configuration including a second, different port to-antenna mapping. The method also comprises determining (S3), based on the first feedback information and the second feedback information, a third beamforming configuration for the multi-antenna system including a third port-to-antenna mapping to enable beamforming according to a third beam form.

23 Claims, 20 Drawing Sheets

(56) References Cited

U.S. PATENT DOCUMENTS

| | | | |
|---|---|---|---|
| 2015/0049824 A1 | 2/2015 | Kim et al. | |
| 2015/0358061 A1* | 12/2015 | Zhang | H04B 7/0456 370/329 |
| 2016/0080051 A1* | 3/2016 | Sajadieh | H04B 7/0456 375/267 |
| 2018/0041260 A1* | 2/2018 | Seifi | H04B 7/0469 |
| 2019/0053244 A1* | 2/2019 | Mildh | H04W 48/10 |

OTHER PUBLICATIONS

Merzakreeva, Alla et al., "Hierarchical Beamforming for Large One-Dimensional Wireless Networks", IEEE International Symposium on Information Theory Proceedings, Jul. 1-6, 2012, 1533-1537.

Unknown, Author, Ericsson, Figures, 36.211, 1-6.

Office Action for European Application No. EP14828579.4, dated Jan. 29, 2019, 4 pages.

\* cited by examiner

BEAMFORMING CONFIGURATION WITH ADAPTIVE PORT-TO-ANTENNA MAPPING FOR A MULTI-ANTENNA SYSTEM

TECHNICAL FIELD

The proposed technology generally relates to beamforming and multi-antenna systems, and in particular to a method and corresponding apparatus for determining a beamforming configuration for a multi-antenna system, as well as a corresponding network node, computer program and computer program product.

BACKGROUND

The modernization of antenna technologies in practice is moving forward in a high pace, which enables the use of more advance antenna setups and techniques in order to increase throughput and robustness in wireless networks such as mobile radio networks. One such technique is to shape the beams, so-called beamforming, of the antenna array. With the use of so called reconfigurable antenna systems, which are already available in practice, beamforming is made possible. The gains that can be achieved with such techniques are promising and seem to be of great importance to achieve the goals of future radio networks.

Recent advancements in antenna technologies include so-called Hierarchical Beamforming, HBF, which is based on dividing antenna array elements into groups to form sub-beamforming arrays [1, 2].

The gains that are promised with advanced beamforming do not come for free as several new problems open up. There are many different ways to implement beamforming using an antenna array, and many of the high-level techniques are known in the academia.

One of the problems with beamforming relates to the errors in the channel estimation and the overhead in feedback reporting (if it is required). The narrower and more fine-tuned beamforming is used, the more sensitive it is to channel estimation errors.

This can introduce very large throughput degradations if the beamforming is based on a highly mismatched channel estimate. In other words, when the transmit power is directed in a specific direction and this direction is not correctly chosen due to some erroneous decision making, the intended direction may not see any signal power where a UE of interest is located and all the beamforming gain will be directed to an incorrect spatial location. It is therefore important to have robust procedures that can adjust the "narrowness" of the beam, i.e. the beam width. A beam form is said to be narrower than another beam form if a sufficiently large percentage of the signal power is directed within a smaller angle from the antenna array compared to the same percentage of signal power of the other beam form. Otherwise, it is said to be wider. Also, in modern radio standards such as LTE (FDD mode of operation), as the granularity of the beams increase so does the simultaneous overhead of the reference signaling. By way of example, to have robust beamforming with high granularity without impractical overhead, the techniques available today are not sufficient.

There is thus a general need to improve beamforming in wireless communication networks.

SUMMARY

It is an object to provide provided a method for determining a beamforming configuration for a multi-antenna system.

It is also an object to provide an apparatus configured to determine a beamforming configuration for a multi-antenna system.

Yet another object is to provide a network node comprising such an apparatus.

Still another object is to provide a computer program for determining, when executed by at least one processor, a beamforming configuration for a multi-antenna system.

It is also an object to provide a corresponding computer program product.

Yet another object is to provide an apparatus for determining a beamforming configuration for a multi-antenna system.

These and other objects are met by embodiments of the proposed technology.

According to a first aspect, there is provided a method for determining a beamforming configuration for a multi-antenna system having at least two antennas and having a port-to-antenna mapping between antenna ports and antennas. The method comprises obtaining first feedback information originating from a wireless device relating to a multi-antenna transmission based on a first beamforming configuration enabling beamforming according to a first beam form, wherein the first beamforming configuration includes a first port-to-antenna mapping. The method also comprises obtaining second feedback information originating from the wireless device relating to a multi-antenna transmission based on a second, different beamforming configuration enabling beamforming according to a second, different beam form, wherein the second beamforming configuration includes a second, different port-to-antenna mapping. The method further comprises determining, based on the first feedback information and the second feedback information, a third beamforming configuration for the multi-antenna system including a third port-to-antenna mapping to enable beamforming according to a third beam form.

According to a second aspect, there is provided an apparatus configured to determine a beamforming configuration for a multi-antenna system having at least two antennas and having a port-to-antenna mapping between antenna ports and antennas. The apparatus is configured to obtain first feedback information originating from a wireless device relating to a multi-antenna transmission based on a first beamforming configuration enabling beamforming according to a first beam form, wherein the first beamforming configuration includes a first port-to-antenna mapping. The apparatus is configured to obtain second feedback information originating from the wireless device relating to a multi-antenna transmission based on a second, different beamforming configuration enabling beamforming according to a second, different beam form, wherein the second beamforming configuration includes a second, different port-to-antenna mapping. The apparatus is configured to determine, based on the first feedback information and the second feedback information, a third beamforming configuration for the multi-antenna system including a third port-to-antenna mapping to enable beamforming according to a third beam form.

According to a third aspect, there is provided a network node comprising an apparatus according to the second aspect.

According to a fourth aspect, there is provided a computer program for determining, when executed by at least one processor, a beamforming configuration for a multi-antenna system having at least two antennas and having a port-to-antenna mapping between antenna ports and antennas. The computer program comprises instructions, which when executed by said at least one processor, cause the at least one processor to:

> read first feedback information originating from a wireless device relating to a multi-antenna transmission based on a first beamforming configuration enabling beamforming according to a first beam form, wherein the first beamforming configuration includes a first port-to-antenna mapping;
> read second feedback information originating from the wireless device relating to a multi-antenna transmission based on a second, different beamforming configuration enabling beamforming according to a second, different beam form, wherein the second beamforming configuration includes a second, different port-to-antenna mapping;
> determine, based on the first feedback information and the second feedback information, a third beamforming configuration for the multi-antenna system including a third port-to-antenna mapping to enable beamforming according to a third beam form.

According to a fifth aspect, there is provided a computer program product comprising a computer-readable medium having stored thereon a computer program according to the fourth aspect.

According to a sixth aspect, there is provided an apparatus for determining a beamforming configuration for a multi-antenna system having at least two antennas and having a port-to-antenna mapping between antenna ports and antennas. The apparatus comprises a first reading module for reading first feedback information originating from a wireless device relating to a multi-antenna transmission based on a first beamforming configuration enabling beamforming according to a first beam form, wherein the first beamforming configuration includes a first port-to-antenna mapping. The apparatus also comprises a second reading module for reading second feedback information originating from the wireless device relating to a multi-antenna transmission based on a second, different beamforming configuration enabling beamforming according to a second, different beam form, wherein the second beamforming configuration includes a second, different port-to-antenna mapping. The apparatus further comprises a determination module for determining, based on the first feedback information and the second feedback information, a third beamforming configuration for the multi-antenna system including a third port-to-antenna mapping to enable beamforming according to a third beam form.

In this way, beamforming configurations may be adaptively determined and/or reconfigured in an efficient manner. This in turn may lead to higher throughput and/or higher robustness against channel estimation errors compared to the prior art.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting terms "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" and "UE" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Figure 1:
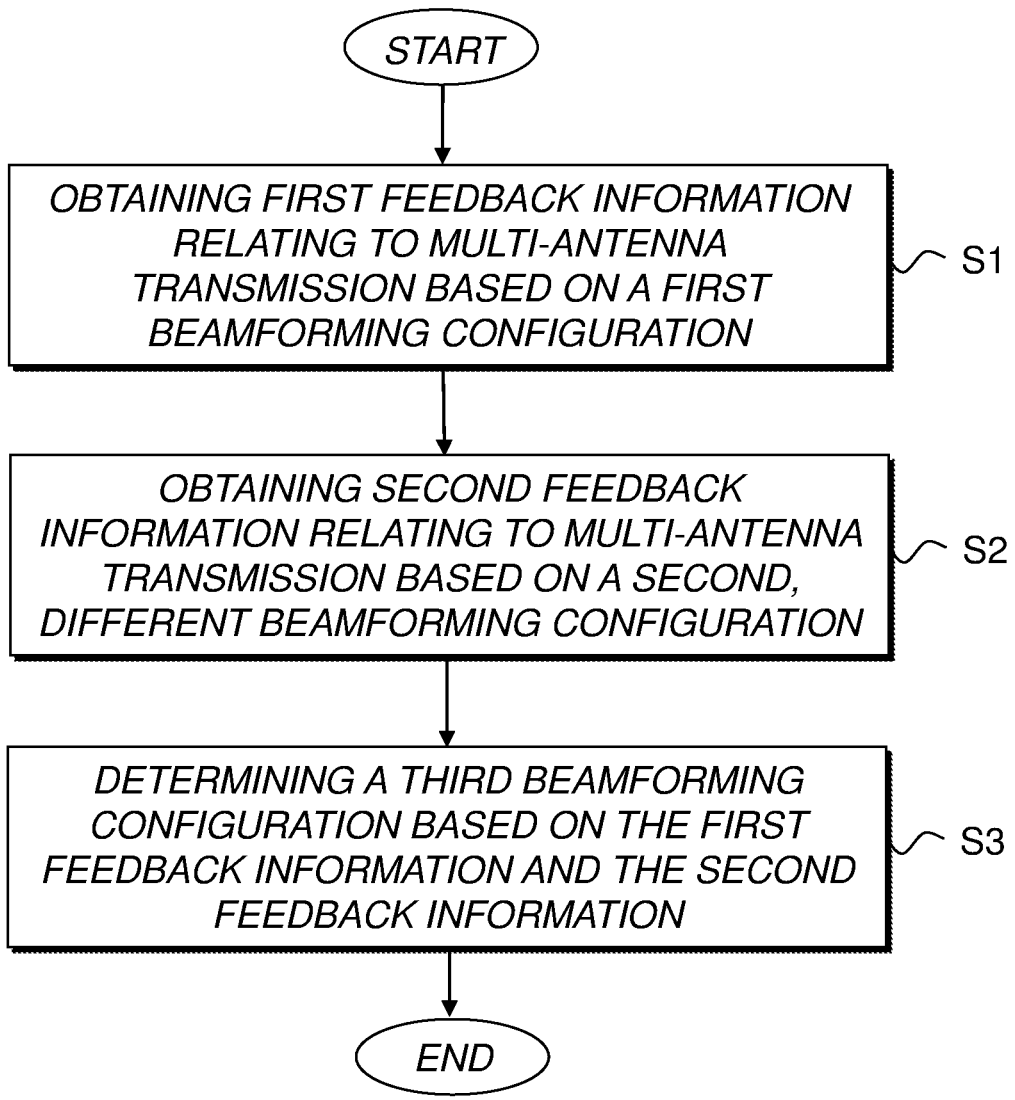
FIG. 1 is a schematic flow diagram illustrating an example of a method for determining a beamforming configuration for a multi-antenna system according to an embodiment.

FIG. 1 is a schematic flow diagram illustrating an example of a method for determining a beamforming configuration for a multi-antenna system according to an embodiment. In general, the multi-antenna system has at least two antennas and a port-to-antenna mapping between antenna ports and antennas. The method basically comprises the following steps:

S1: obtaining first feedback information originating from a wireless device relating to a multi-antenna transmission based on a first beamforming configuration enabling beamforming according to a first beam form, wherein the first beamforming configuration includes a first port-to-antenna mapping;

S2: obtaining second feedback information originating from the wireless device relating to a multi-antenna transmission based on a second, different beamforming configuration enabling beamforming according to a second, different beam form, wherein the second beamforming configuration includes a second, different port-to-antenna mapping; and S3: determining, based on the first feedback information and the second feedback information, a third beamforming configuration for the multi-antenna system including a third port-to-antenna mapping to enable beamforming according to a third beam form.

In this way, a new beamforming configuration including a new port-to-antenna mapping may be determined by using feedback information relating to multi-antenna transmissions based on at least two different previous beamforming configurations. By considering feedback information relating to beamforming configurations, i.e. the first beamforming configuration and the second beamforming configuration, having different port-to-antenna mappings, the port-to-antenna mapping of the new, third beamforming configuration may be adaptively reconfigured in an efficient manner.

This in turn may lead to higher throughput and/or higher robustness against channel estimation errors compared to the prior art.

In a sense, this can be regarded as a scheme for adaptive port-to-antenna mapping based on user feedback relating to multi-antenna transmission using at least two other different beamforming configurations. This can be seen in contrast to normal multi-antenna systems in e.g. Long Term Evolution, where the port-to-antenna mapping is normally fixed, while allowing for standard precoding of the signals to be transmitted over the antennas.

By way of example, the third beamforming configuration is determined such that the third beam form has a beam width that differs from the beam widths of at least one of the first beam form and the second beam form and/or a beamforming direction that differs from the beamforming direction of at least one of the first beam form and the second beam form.

For example, the third beamforming configuration may be determined to provide a third beamform that represents a narrower or a wider beamform with respect to the first beamform and/or second beamform. Typically, the first beamform and the second beamform may have different beam widths.

As an example, the third beamforming configuration is preferably determined such that the third beam form is at least partly overlapping with respect to at least one of the first beam form and the second beam form.

The steps S1 and S2 do not have to be performed in any particular order, and the terms "first" and "second" do not necessarily imply any order in time. In principle, the steps S1 and S2 may even be performed more or less in parallel.

Figure 2:
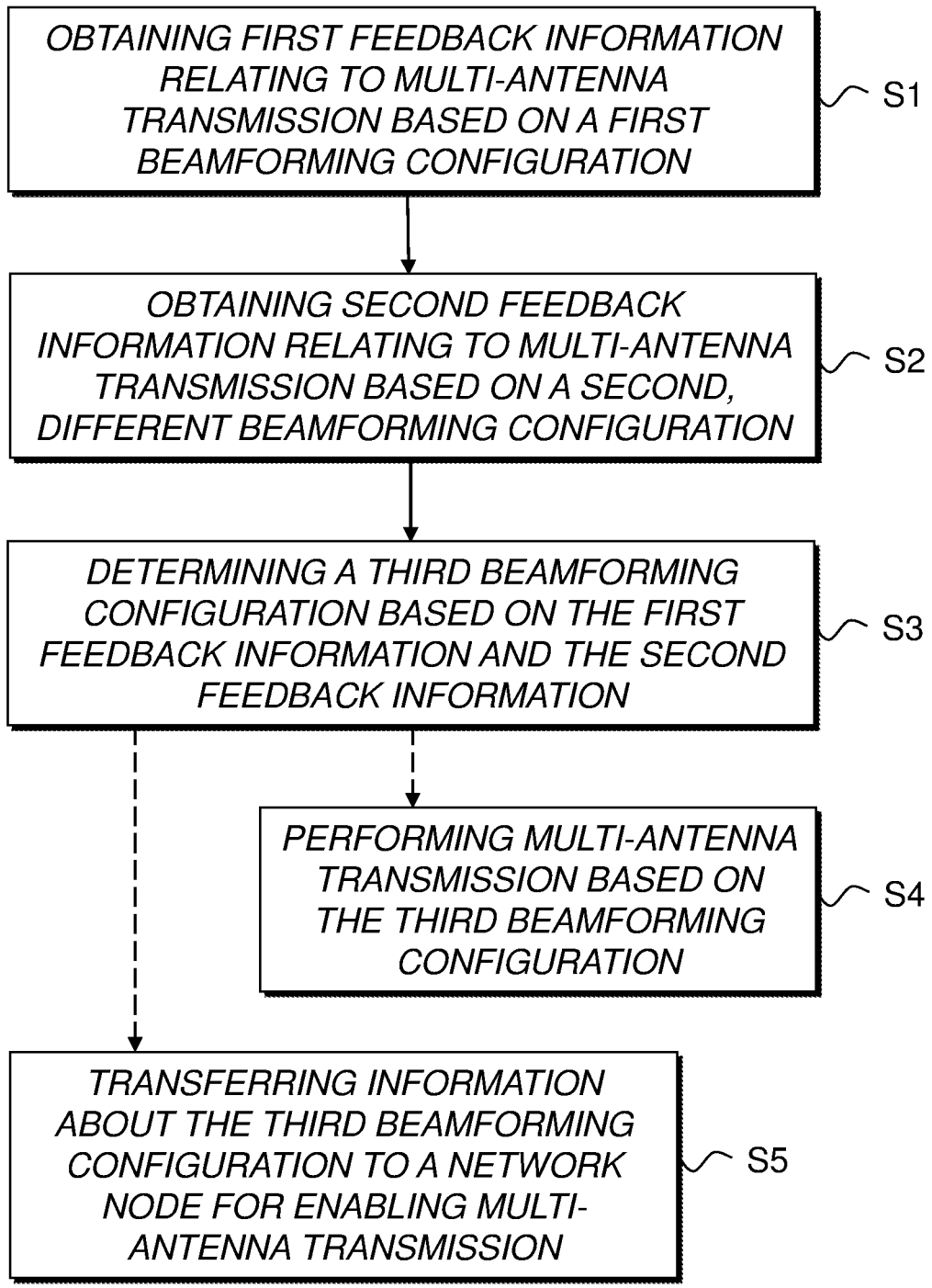
FIG. 2 is a schematic flow diagram illustrating another example of a method for determining a beamforming configuration for a multi-antenna system according to an embodiment.

FIG. 2 is a schematic flow diagram illustrating another example of a method for determining a beamforming configuration for a multi-antenna system according to an embodiment. The flow diagram of FIG. 2 is similar to that of FIG. 1 except for the optional alternatives set forth in steps S4 and S5.

Step S4 involves performing multi-antenna transmission of at least one reference signal based on the determined third beamforming configuration.

Step S5 involves transferring information about the determined third beamforming configuration to a network node for enabling multi-antenna transmission of at least one reference signal based on the determined third beamforming configuration.

This will be further illustrated later on with reference to examples shown in the signaling diagrams of FIGS. 7 and 8.

Figure 3:
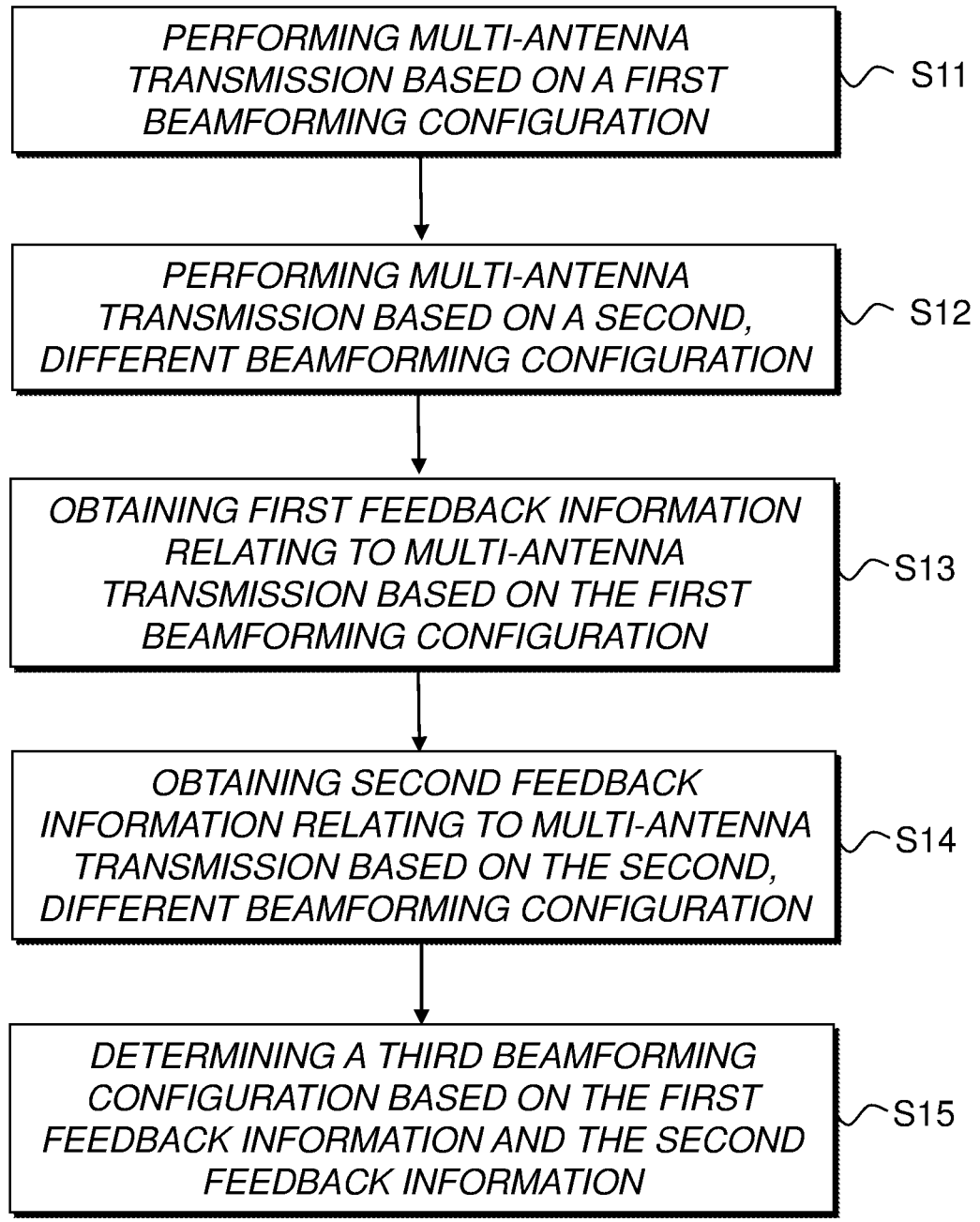
FIG. 3 is a schematic flow diagram illustrating yet another example of a method for determining a beamforming configuration for a multi-antenna system according to an embodiment.

FIG. 3 is a schematic flow diagram illustrating yet another example of a method for determining a beamforming configuration for a multi-antenna system according to an embodiment. The flow diagram of FIG. 3 is similar to that of FIG. 1 except for the complementary, optional steps of performing multi-antenna transmissions based on the first and second beamforming configurations. More particularly, in this specific example, the method further comprises the following steps:

S11: performing, based on the first beamforming configuration, multi-antenna transmission of at least one reference signal according to the first beam form to enable obtaining the first feedback information; and S12: performing, based on the second beamforming configuration, multi-antenna transmission of at least one reference signal according to the second beam form to enable obtaining the second feedback information.

By way of example, the first beam form and the second beam form may have different beam widths.

In this particular example, steps S1 to S3 of FIG. 1 are represented as steps S13 to S15 in FIG. 3.

The steps S11 and S12 do not have to be performed in any particular order, and the terms "first" and "second" do not necessarily imply any order in time. In principle, the steps S11 and S12 may even be performed more or less in parallel.

In the particular example of FIG. 3, the steps S11 to S15 may be performed by a network node such as a base station. It should though be understood that steps S11 and S12 may be performed by a different network node or entity than the network node or entity responsible for performing steps S13 to S15 (S1 to S3). In other words, the actual determination of the beamforming configuration(s) can be performed separately from the multi-antenna transmissions of the reference signal(s) that form the basis for the feedback from the wireless device.

In an optional embodiment, the first feedback information includes first channel quality information and/or first precoding information, and the second feedback information includes second channel quality information and/or second precoding information.

By way of example, the third beamforming configuration may be determined based on a comparison of the first channel quality information and the second channel quality information.

For example, the third beamforming configuration may be determined based on at least one of the first precoding information and the second precoding information.

In a particular example, the third beamforming configuration may be determined, if the first beam form is wider than the second beam form and the first channel quality information is more than an offset better than the second channel quality information, such that the third beam form is wider than the second beam form. This represents a zoom-out procedure since a wider beam form is enabled.

In another particular example, the third beamforming configuration may be determined, if the first beam form is wider than the second beam form and the second channel quality information is more than an offset better than the first channel quality information, such that the third beam form is narrower than the first beam form. This represents a zoom-in procedure since a narrower beam form is enabled.

By way of example, the third beamforming configuration may be determined to enable activation of a larger number of antennas than the first beamforming configuration and/or the second beamforming configuration. This usually provides a zoom-in effect on the beamforming.

As an example, the first feedback information and the second feedback information may belong to the same feedback process and be obtained at different time instances.

For example, the feedback process may be a Channel State Information, CSI, process associated with a reference signal configuration for multi-antenna transmission based on a beamforming configuration to enable feedback from the wireless device.

Alternatively, the first feedback information and the second feedback information may belong to different feedback processes.

By way of example, the newly determined beamforming configuration may be related to at least one of the different feedback processes, or related to yet another different feedback process.

For example, the different feedback processes may be Channel State Information, CSI, processes, each CSI process being associated with a reference signal configuration for multi-antenna transmission based on a beamforming configuration to enable feedback from the wireless device.

More generally, a feedback process is associated with a set of at least one reference signal for multi-antenna transmission based on a beamforming configuration to enable feedback from the wireless device.

Figure 4:
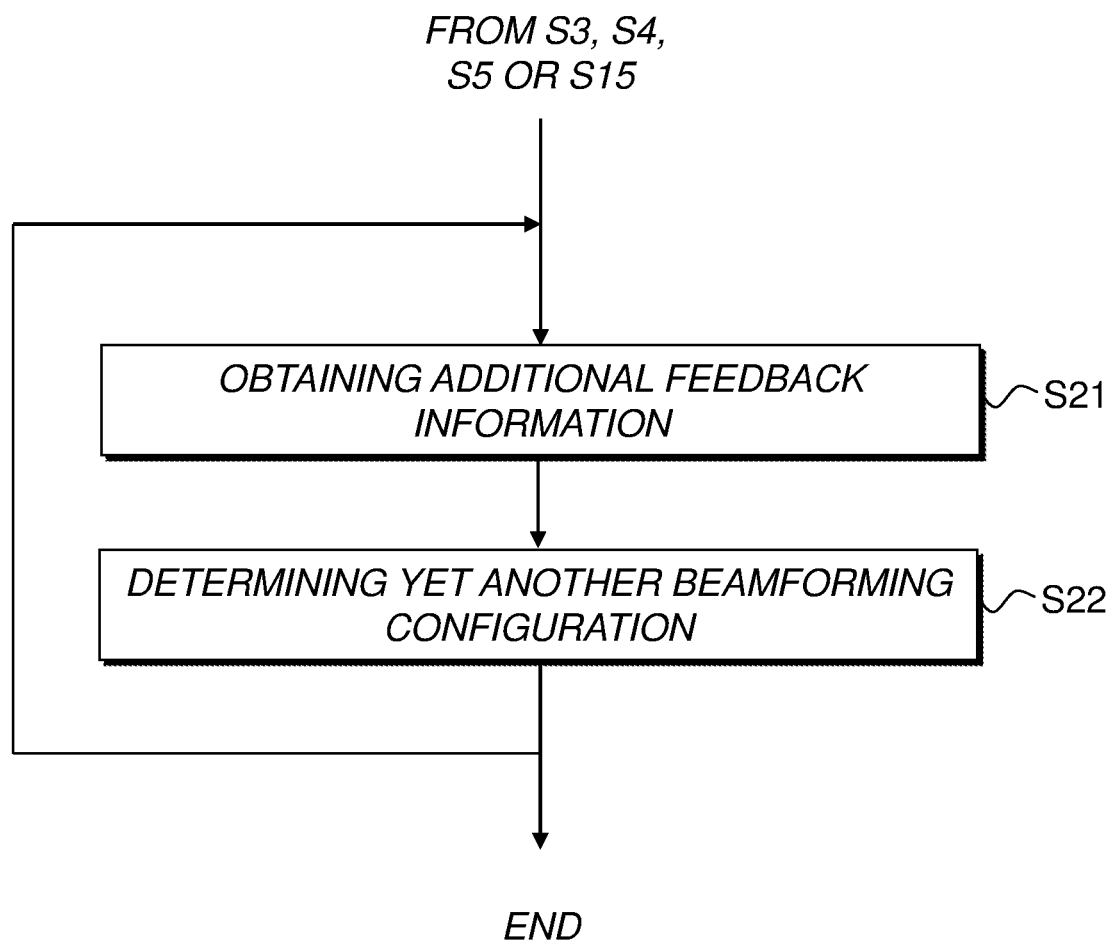
FIG. 4 is a schematic flow diagram illustrating an example of how the method for determining a beamforming configuration for can be extended and optionally performed iteratively.

FIG. 4 is a schematic flow diagram illustrating an example of how the method for determining a beamforming configuration for can be extended and optionally performed iteratively.

For all the method flows described herein, the method may further comprise the following steps:

S21: obtaining additional feedback information from a wireless device relating to a multi-antenna transmission based on the determined beamforming configuration, and S22: determining, based on the additional feedback information and at least one of the previously obtained feedback information, yet another beamforming configuration for the multi-antenna system.

As an example, the steps S21, S22 of obtaining additional feedback information and determining yet another updated beamforming configuration for the multi-antenna system may be iteratively performed.

Figure 5:
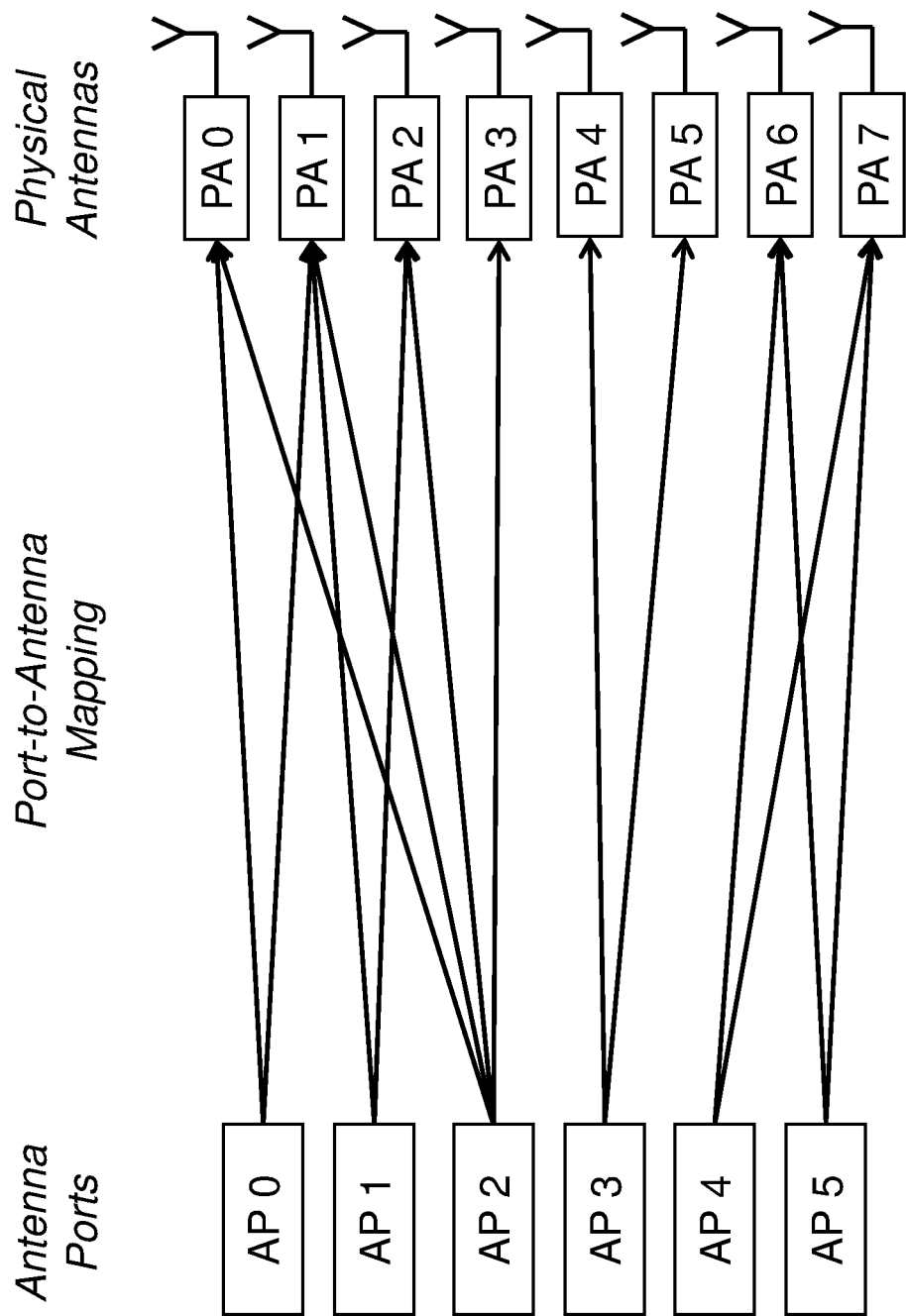
FIG. 5 is a schematic diagram illustrating an example of a set of antenna ports and a set of physical antennas with a corresponding port-to-antenna mapping.

FIG. 5 is a schematic diagram illustrating an example of a set of antenna ports and a set of physical antennas with a corresponding port-to-antenna mapping.

In the particular example of FIG. 5, there is a set of antenna ports AP 0 to AP 5 that are coupled or connected to a set of physical antennas, normally through a set of power amplifiers, PA 0 to PA 7. The port-to-antenna mapping, which is sometimes also referred to as antenna-to-port-mapping or simply antenna mapping, may also involve a weighting between each port and antenna that enables an individual shift in phase and/or amplitude.

It should be understood that the port-to-antenna mapping of FIG. 5 is merely an illustrative example, and that the proposed technology is not limited thereto. For example, the number of antenna ports and antennas may vary.

In general, the port-to-antenna mapping of the multi-antenna system defines how a signal input to at least one antenna port is transmitted through a set of one or more physical antennas. In this context, each port can be regarded as having its own port-to-antenna mapping between the port and at least one antenna.

Figure 6:
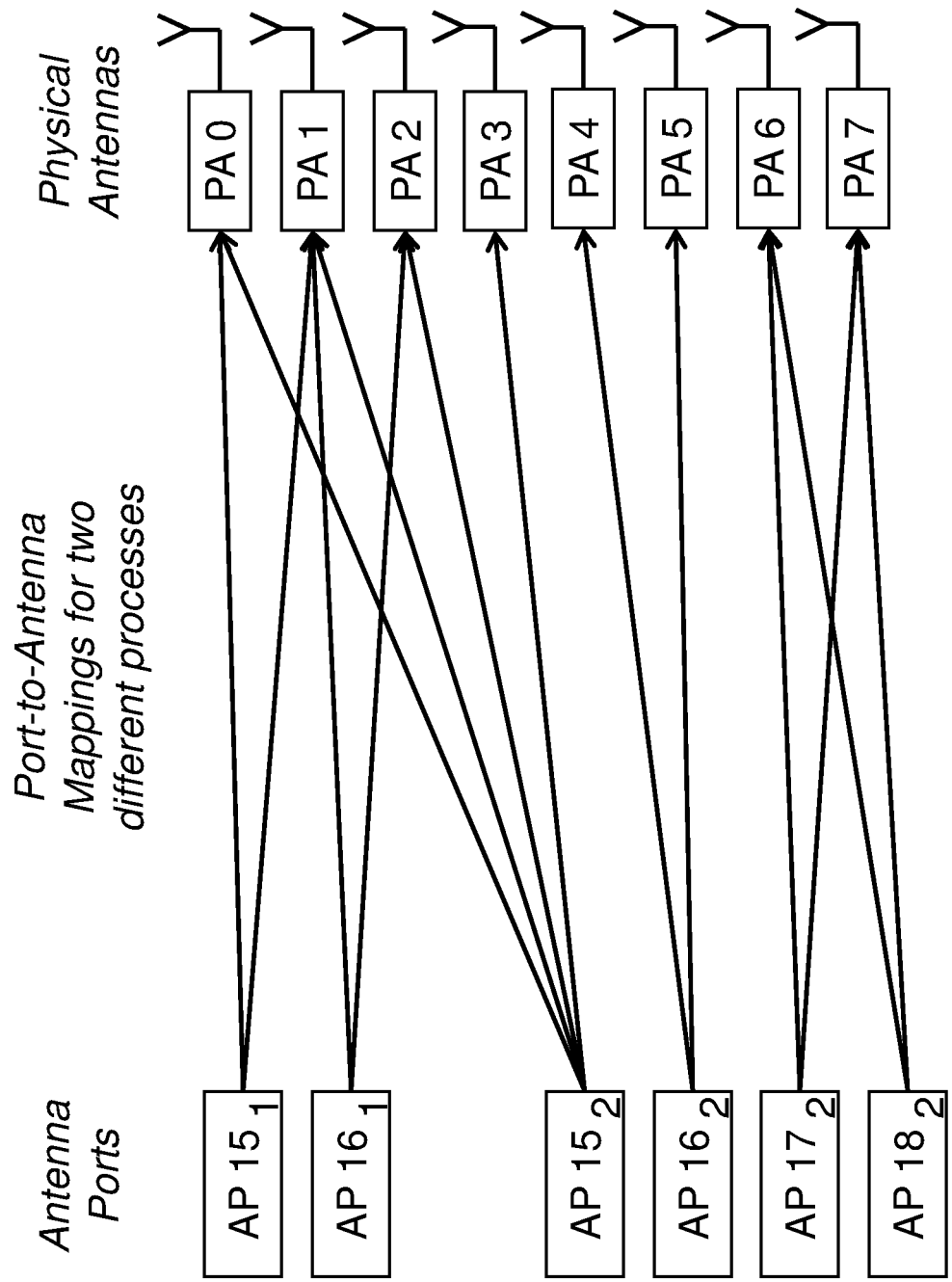
FIG. 6 is a schematic diagram illustrating an example of the port-to-antenna mappings for two different feedback processes.

FIG. 6 is a schematic diagram illustrating an example of the port-to-antenna mappings for two different feedback processes. The feedback processes are designated by a respective sub-index 1 and 2.

In the particular example of FIG. 6, for feedback process 1, there is a set of antenna ports AP $15_1$ and AP $16_1$ that are coupled or connected to a set of physical antennas, normally through a set of power amplifiers, PA 0 to PA 2. For feedback process 2, there is a set of antenna ports AP $15_2$ to AP $18_2$ that are coupled or connected to a set of physical antennas, normally through a set of power amplifiers, PA 0 to PA 7.

For a more hands-on feeling, an illustrative example of the port-to-antenna mappings for the two feedback processes of FIG. 6 will now be given below:

Feedback process 1:
  AP $15_1$: $1/\sqrt{2}$ [1 1 0 0 0 0 0 0]
  AP $16_1$: $1/\sqrt{2}$ [0 i 1 0 0 0 0 0]
Feedback process 2:
  AP $15_2$: $1/\sqrt{2}$ [1 i 1 i 0 0 0 0]
  AP $16_2$: $1/\sqrt{2}$ [0 0 0 0 1 1 0 0]
  AP $17_2$: $1/\sqrt{2}$ [0 0 0 0 0 0 1 i]
  AP $18_2$: $1/\sqrt{2}$ [0 0 0 0 0 0 i 1]

Naturally, it should be understood that the port-to-antenna mappings of FIG. 6 are merely illustrative examples.

The antennas can be located both horizontally and/or vertically. The procedure of "zooming in" or "zooming out" can be executed in a system with both horizontally and vertically aligned antennas from step to step. One could switch from step to step in combining parts of some array-rows and some array-columns to perform zoom in/out in a two-dimensional antenna array. So, the procedure is not limited to single dimensional antenna arrays and can be utilized in systems with two-dimensional antenna arrays as well.

It should also be understood that the port-to-antenna mapping as defined herein may be combined or integrated with any other form of coding, such as precoding, of the signals to be transmitted through one or more of the antennas.

By way of example, a reference signal can be sent on each antenna port on its own resources, which are orthogonal, in time, frequency and/or code domain, to other reference signals sent on other antenna ports. In this way, a wireless device such as a UE can measure the channel related to each antenna port. This enables the wireless device to 'see' the different antenna ports, unlike the port-to-antenna mapping.

For each process, the wireless device can transmit, e.g. Channel State Information, CSI, to the base station, including feedback information such as Precoder Matrix to Index, PMI, Rank Index, RI and/or a Channel Quality Indicator, CQI.

For example, for the first feedback process, the precoder matrix will have two rows corresponding to the two antenna ports, and for the second feedback process, the precoder matrix will have four rows corresponding to the four antenna ports. The number of columns will depend on the number of layers, i.e. the number of parallel streams to be transmitted.

The precoder controls how to combine the different antenna ports for data transmissions. For example, if the UE suggests a PMI for process 1 that corresponds to the precoding vector $$1/\sqrt{2}\begin{bmatrix} i \\ 1 \end{bmatrix}$$

for data transmissions, when combining the port-to-antenna mapping for process 1 with this precoding vector, the data will be sent according:

$$[AP15_1 AP16_1] \cdot 1/\sqrt{2}\begin{bmatrix} i \\ 1 \end{bmatrix} = 1/\sqrt{2} \, i \cdot AP15_1 + 1/\sqrt{2} \cdot AP16_1 =$$

$$1/2[ii000000] + 1/2[0i100000] = [i/2i1/200000].$$

Figure 7:
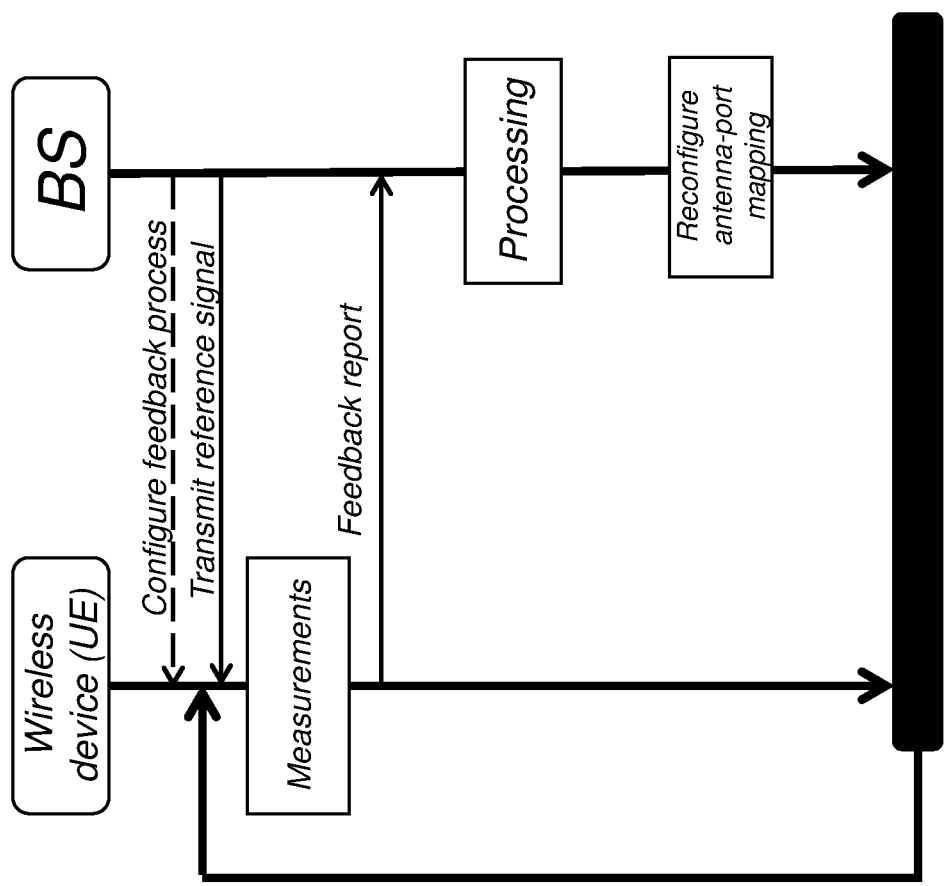
FIG. 7 is a schematic signaling diagram illustrating an example of actions and signaling between a wireless device and a base station according to an embodiment.

FIG. 7 is a schematic signaling diagram illustrating an example of actions and signaling between a wireless device and a base station according to an embodiment.

In this example, the base station, BS, or equivalent network node may configure the feedback process(es) and transmit a corresponding set of one or more reference signals. The UE may then perform measurements, and provide a feedback report including feedback information to the base station. This may repeated, for the same feedback process or for additional feedback processes, for a number of different beamforming configurations for transmission of the reference signals(s). The base station may then perform relevant processing as described herein to determine a new beamforming configuration, and then reconfigure the antenna-port-mapping.

Figure 8:
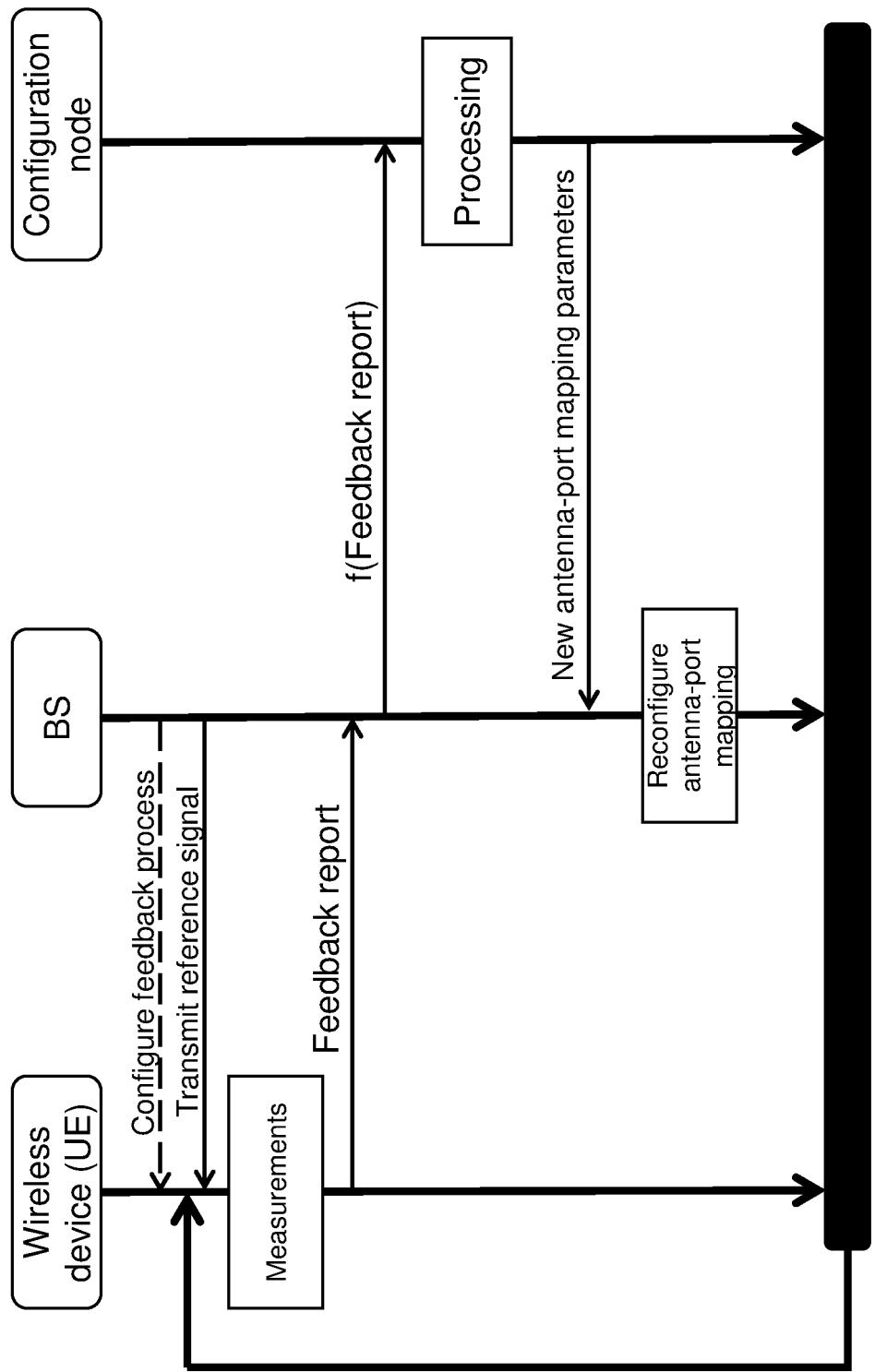
FIG. 8 is a schematic signaling diagram illustrating an example of actions and signaling between a wireless device, a base station and a configuration node according to another embodiment.

FIG. 8 is a schematic signaling diagram illustrating an example of actions and signaling between a wireless device, a base station and a configuration node according to another embodiment.

In this alternative example, the base station or equivalent network node forwards the feedback report, either directly or possibly filtered or transformed, to a configuration node, which performs the processing for determining a new beamforming configuration as described herein. The configuration node may then transfer the new antenna-port mapping parameters to the base station, which may then reconfigure the antenna-port mapping.

The proposed technology enables processing and combining of feedback information originating from a wireless device such as a UE to generate new antenna-port mappings, and allows well-formed decisions, e.g. on whether the beamforming should "zoom in" or "zoom out".

Figure 9:
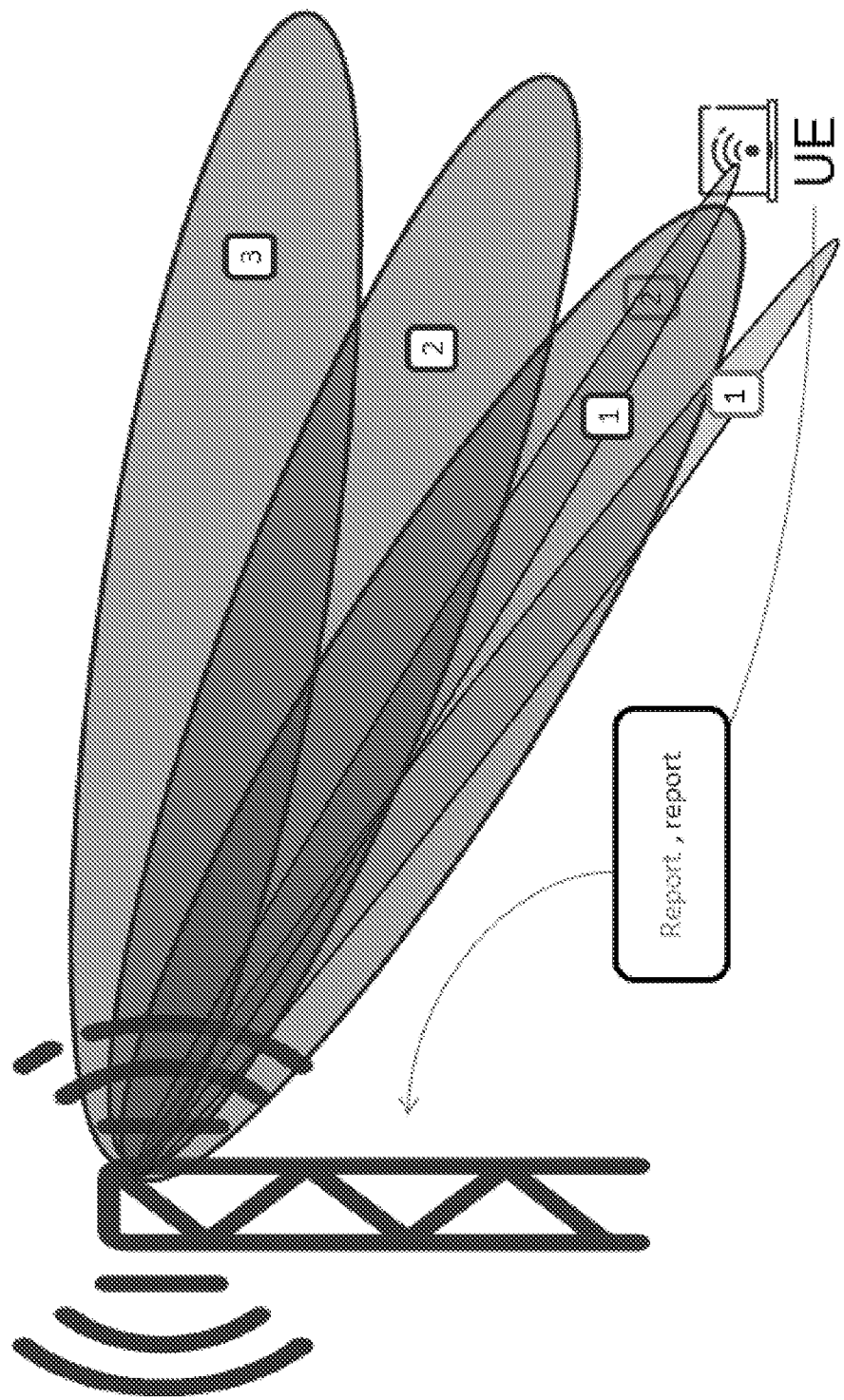
FIG. 9 is a schematic diagram illustrating an example of different beam configurations of different beam widths and/or beamforming directions for which a UE may provide feedback to the base station.

FIG. 9 is a schematic diagram illustrating an example of different beam configurations of different beam widths and/or beamforming directions for which a UE may provide feedback to the base station.

The wider beams illustrates the choices of precoders for a first CSI process, denoted A. In this case, precoder index 1 provides the best beamforming gain. This precoder index may then be used to configure a second CSI process, denoted B, which has antenna-port mappings of narrower directions and where the wireless device such as a UE can choose between precoders corresponding to narrower beams. In this stage, precoder index 2 of the narrower beams provides the best gain.

Figure 10A:
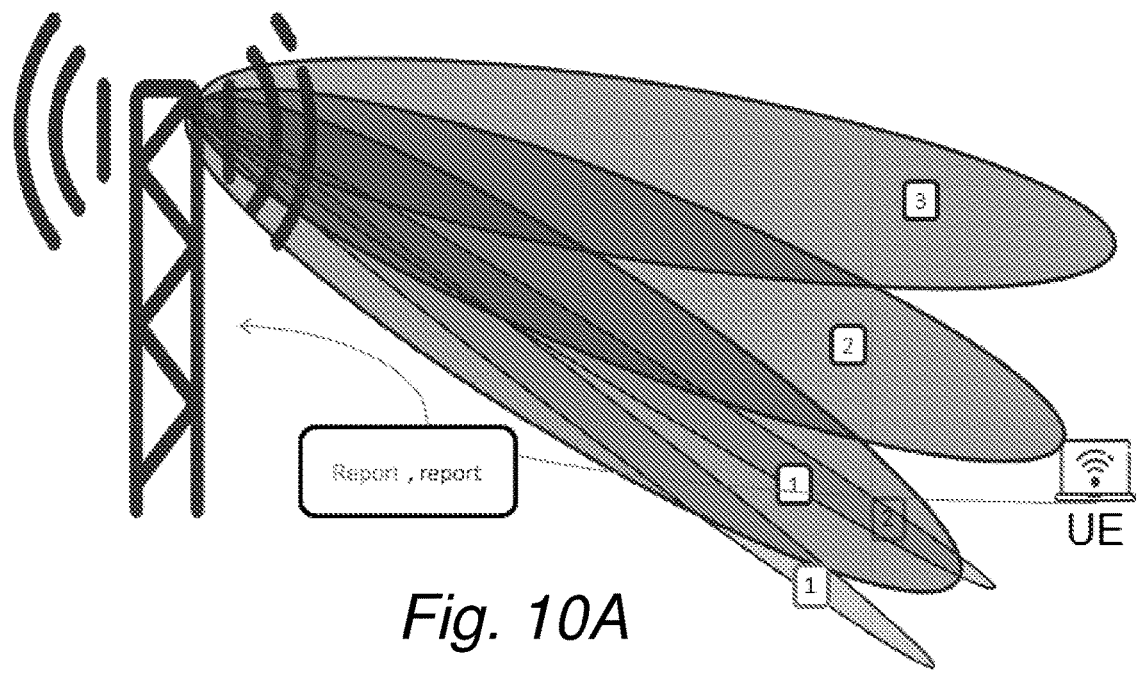
FIGS. 10A-B are schematic diagrams illustrating an example of how the feedback information can be used to change beam width and/or beamforming direction through reconfiguration of port-to-antenna mapping.
Figure 10B:
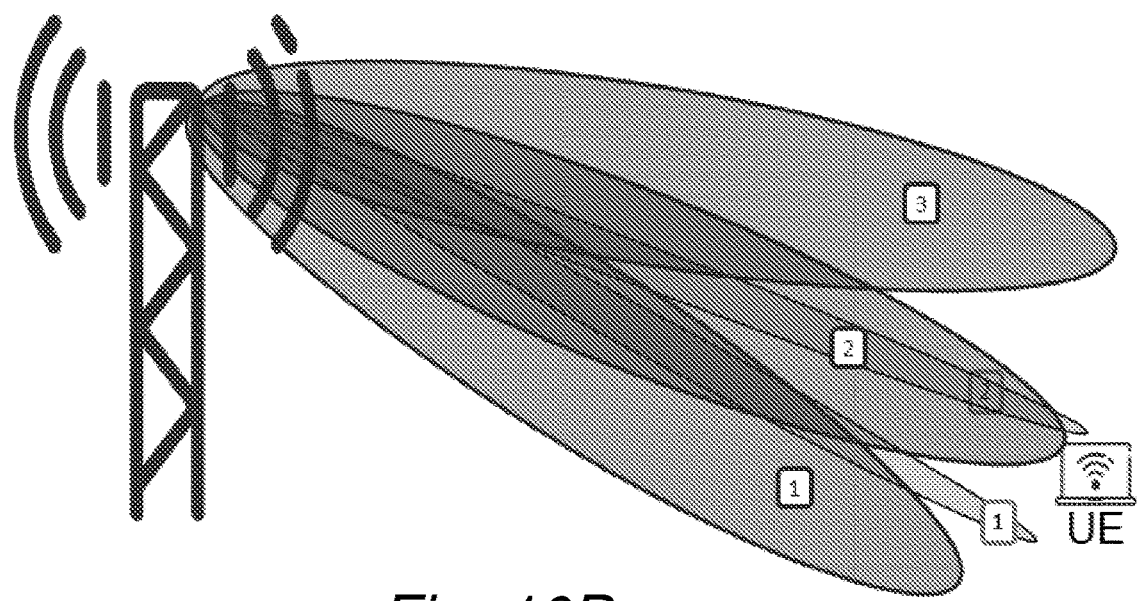

FIGS. 10A-B are schematic diagrams illustrating an example of how the feedback information can be used to change beam width and/or beamforming direction through reconfiguration of port-to-antenna mapping.

In this case, the reports from then UE informs the base station that the narrower beams should be pointed more towards the wide beam number 2. If the base station would only rely on the narrower beams, then it would be difficult to know whether the signal strength drop is due to misdirection or some other loss in path gain. With the reports from the wider beams, the base station knows that the second wide beam points towards the UE and that the narrower beams therefore are not correctly directed.

When beamforming the data, the base station could use only the wider beams as the narrower beams currently are not correctly directed.

FIGS. 11A-H are schematic diagrams illustrating an example of how to change beam width and/or beamforming direction through reconfiguration of the port-to-antenna mapping.

Figure 11A:
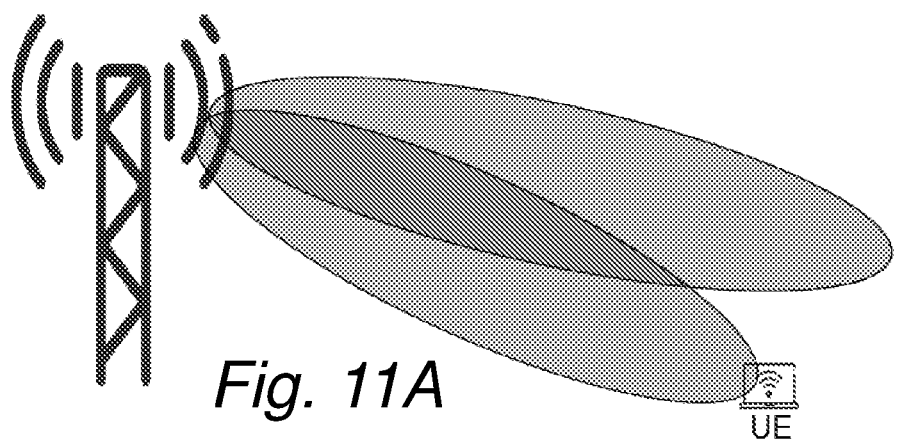
FIGS. 11A-H are schematic diagrams illustrating an example of how to change beam width and/or beamforming direction through reconfiguration of the port-to-antenna mapping.
Figure 11B:
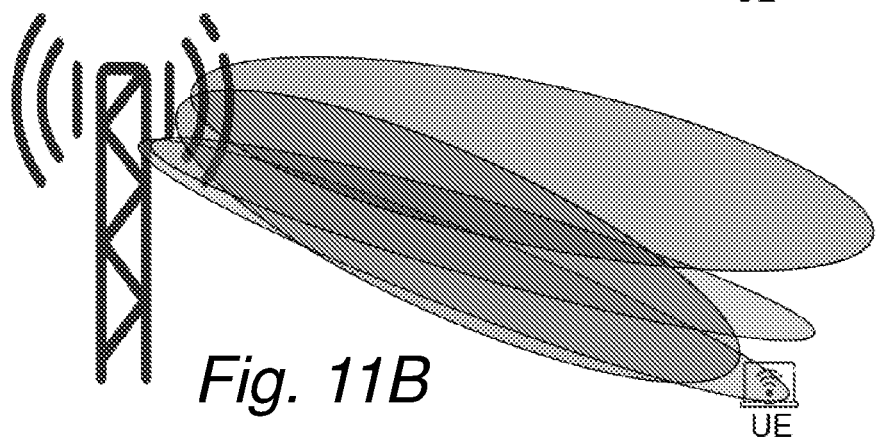
Figure 11C:
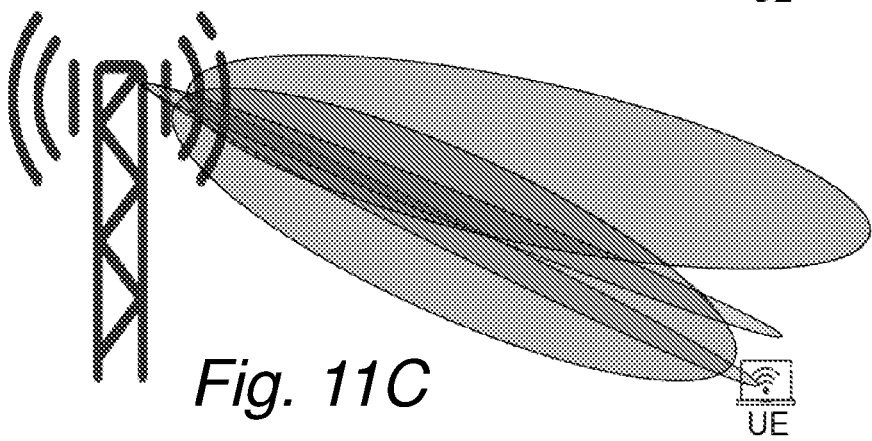
Figure 11D:
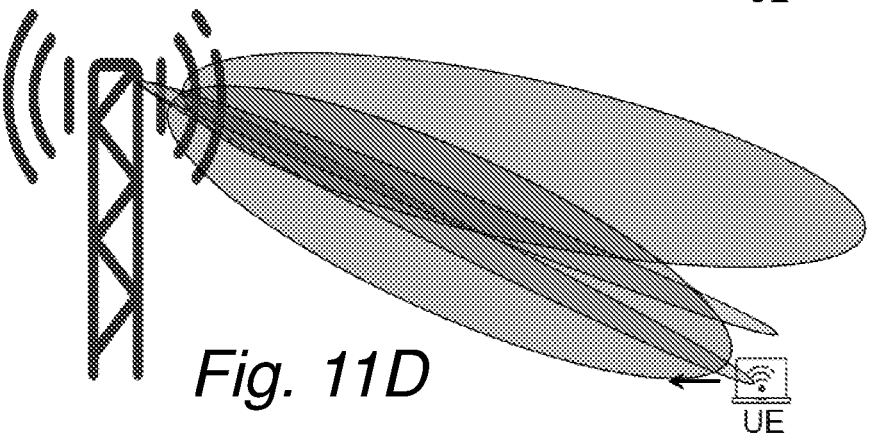
Figure 11E:
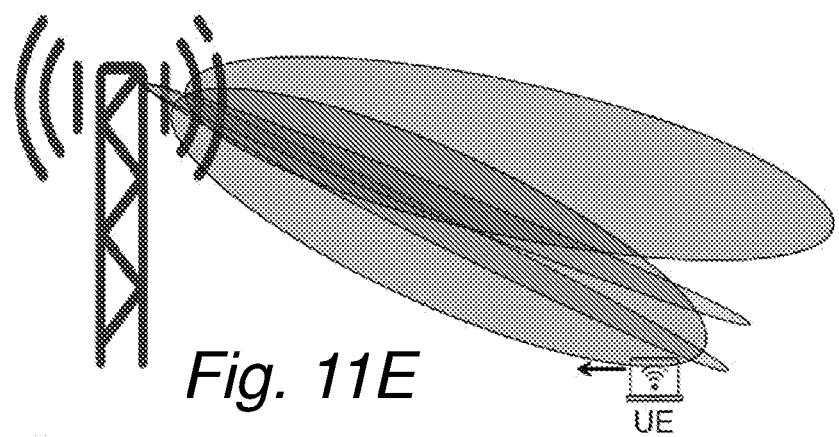
Figure 11F:
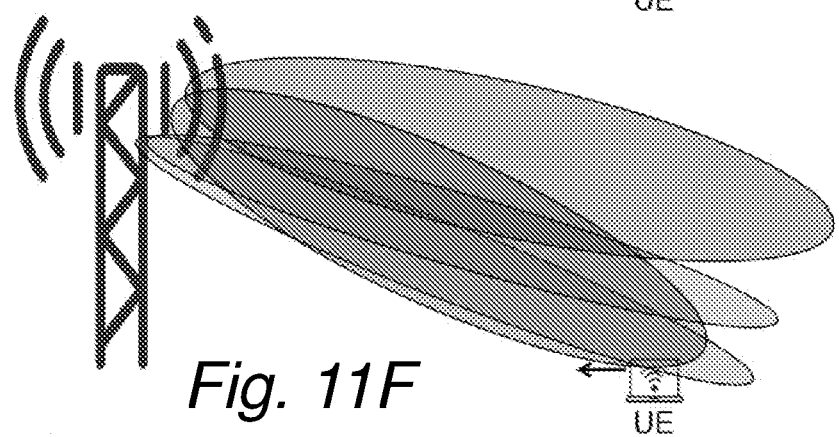
Figure 11G:
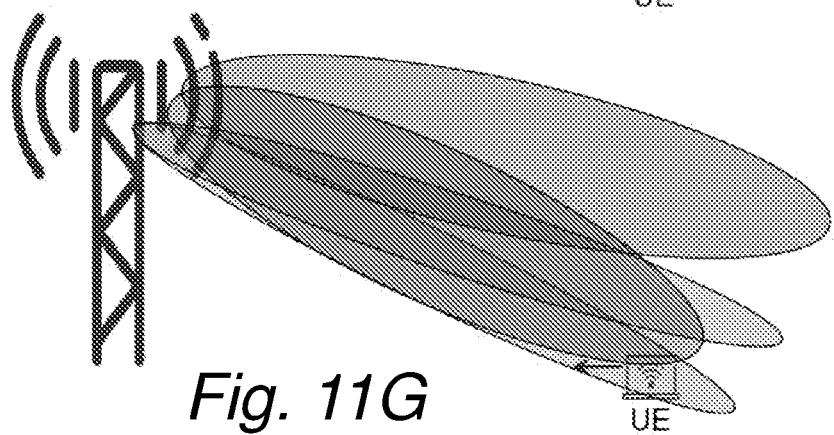
Figure 11H:
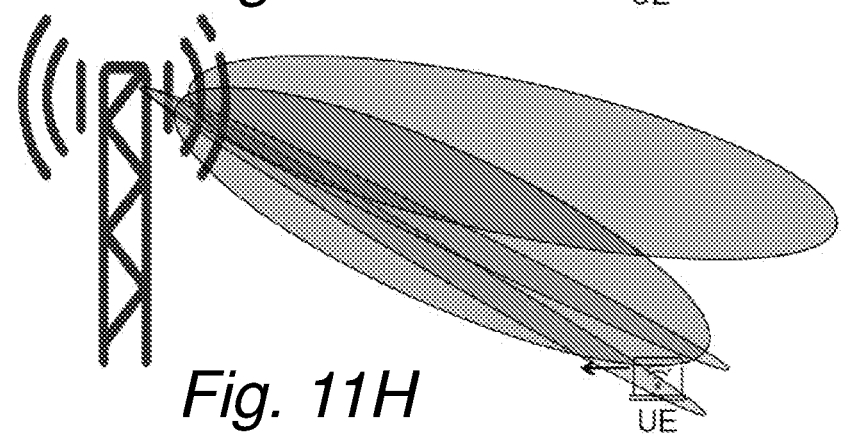

In this case, the base station use the wider beams of the first CSI process to create more narrow beams belonging to a second CSI process (FIGS. 11A-B). The narrow beams are then step by step narrowed in order to increase the beamforming gain (FIG. 11C). If the narrow beams are pointing in the wrong direction, e.g. because the UE is starting to move out of range (FIGS. 11D-E), it is possible to zoom out (FIG. 11F) and with the new reports make a new zooming (FIGS. 11G-H). The wider beams may be used in case of sudden direction changes.

As indicated, the beamforming procedure can be adapted to be able to "zoom out" if needed, which is a distinct beneficial feature of the proposed technology.

In the following, the proposed technology will be described from the perspective of Long Term Evolution, LTE, but it can also be applied to other radio access technologies. The proposed technology is not limited to the below examples.

By way of example, the feedback loop where the UE reports the preferred direction can be realized by normal CSI reports where a precoder is chosen. Each choice of precoder corresponds to a beamforming vector, corresponding to a spatial direction along which data is transmitted. In LTE, for example, the UEs can currently report precoders which constitute a fix set of different combinations of phase shifts on the antenna ports.

The chosen beamforming direction can be used to create new antenna-port mappings, such that the new ports are beamformed, e.g. made narrower (zoom-in) or wider (zoom-out). When new antenna-port mappings have been decided and configured, the base station may send a new set of reference signal(s) for which the UE reports back the feedback based on these new mappings. Hence, the beamformed vectors can be iteratively adjusted to make narrower beams, or wider beams if required, to a steady state of the procedure or to the extent the physical limit allows (related to the number of antenna elements).

For practical reasons, it might not be desirable to have too narrow beams. The variations in the spatial directions could be large when the UEs are moving. Recall that if the beams are too narrow, the resulting beamforming gain can be quite poor if they are misdirected. It may be useful to adapt the level of zooming to the current conditions such that high beamforming gains can be exploited at the same time as having robust performance.

According to a particular example, a way of handling this is to include the functionality of comparing different levels of zooming and choosing the most appropriate zoom level. This can for example be implemented with one or more CSI processes. The following steps explain an example procedure. This particular example assumes two ports, but can be expanded to any number of ports (one or more). The antennas are assumed to be highly correlated but the invention is not limited to this specific exemplifying case.

Figure 12:
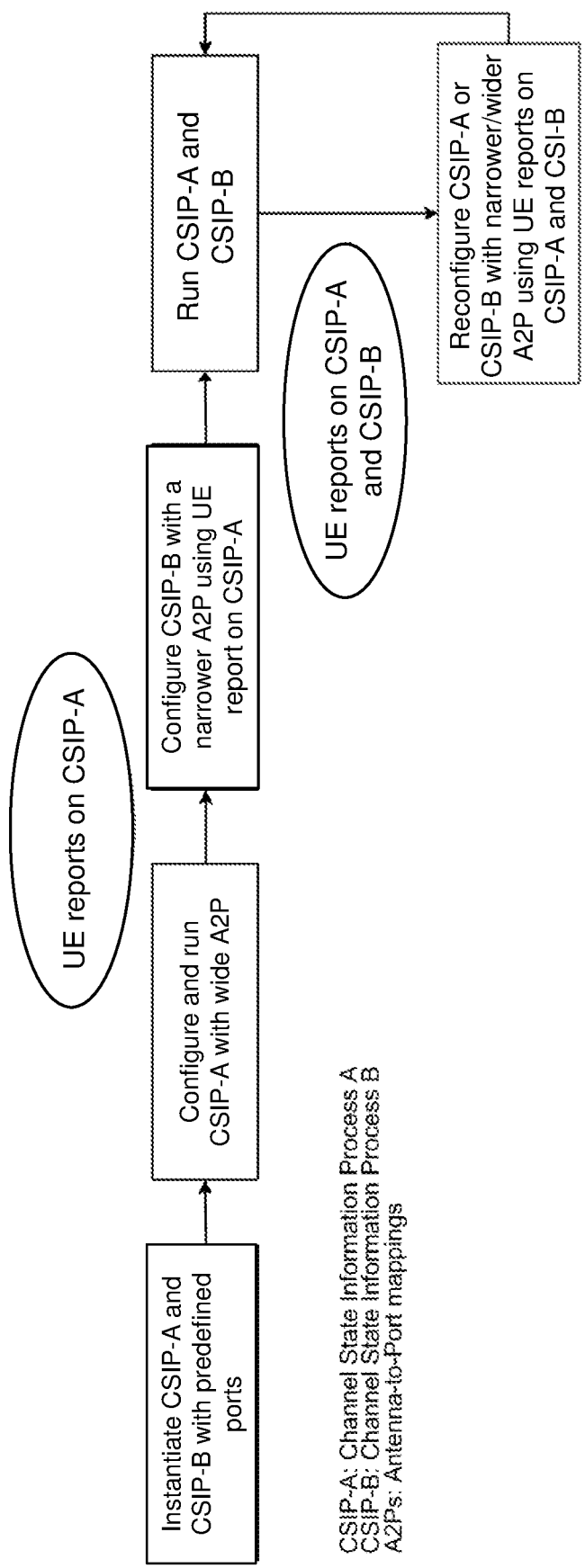
FIG. 12 is a schematic flow diagram illustrating an example of how to configure and reconfigure feedback processes based on UE reports according to an embodiment.

FIG. 12 is a schematic flow diagram illustrating an example of how to configure and reconfigure feedback processes based on UE reports according to an embodiment.

At first, the two ports are configured with a default configuration based on global parameters and reference signals. These default ports should preferably be directed towards the area which the UE is located. As this might not be exactly known, this area could be quite wide. Then, reference signals are transmitted over the two default ports for which the UE reports back a beamforming suggestion, via the PMI for instance. By way of example, this can be performed using a CSI process, labeled as process A, or CSIP-A. This beamform corresponds to a spatial direction, supposedly where the UE is located, and is used to configure a new CSI process, called process B or CSIP-B, with two new ports. These ports are created with antenna-port mappings that are directed along the spatial direction of the beamform reported (again, represented with PMI for instance) by the UE in CSI process A. For example, CSIP-B is configured with a narrower beam using the UE report on process A. Next, run both CSIP-A and CSIP-B. In the next steps, the UE will report on the corresponding two CSI processes. By way of example, CSIP-A or CSIP-B may be reconfigured with narrower/wider beam using the UE reports on CSIP-A and CSIP-B.

At all steps, data may be transmitted, for example using the beamform of the process which provides the best performance, the PMI with highest CQI for instance. In a pessimistic and robust setup, one could choose the best PMI of the wider CSIP for instance.

Figure 13:
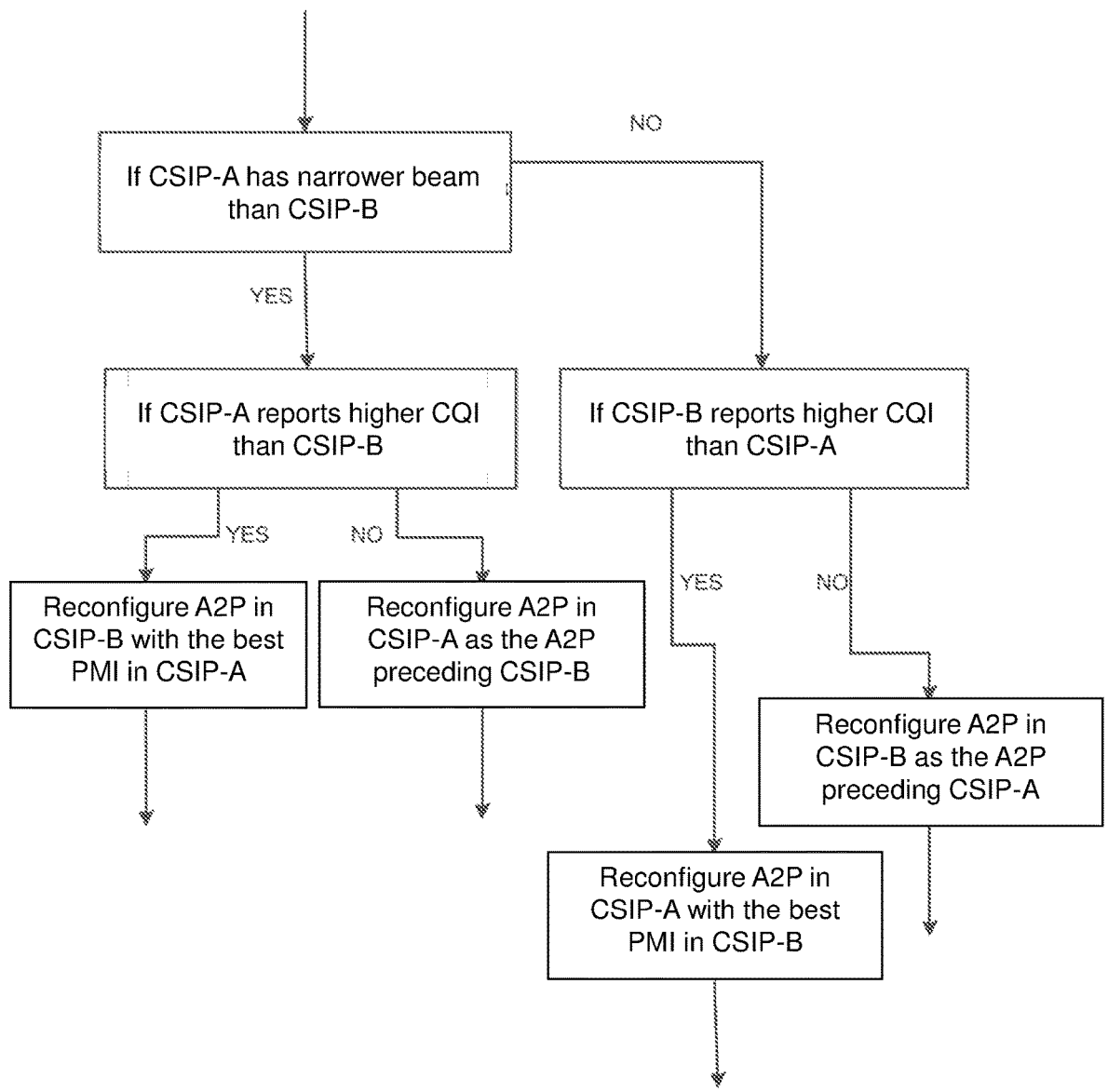
FIG. 13 is a schematic flow diagram illustrating an example of reconfiguration of antenna-to-port-mappings of feedback processes based on UE feedback reports according to an embodiment.

FIG. 13 is a schematic flow diagram illustrating an example of reconfiguration of antenna-to-port-mappings of feedback processes based on UE feedback reports according to an embodiment.

If CSIP-A has (YES) a narrower beam than CSIP-B, then check if CSIP-A reports higher CQI than CSIP-B. If YES, then reconfigure the antenna-to-port mapping in CSIP-B with the best PMI in CSIP-A. If NO, then reconfigure the antenna-port mapping in CSIP-A as the antenna-port mapping preceding CSIP-B.

If CSIP-A does not have (NO) a narrower beam than CSIP-B, then check if CSIP-B reports higher CQI than CSIP-A. If YES, then reconfigure the antenna-to-port mapping in CSIP-A with the best PMI in CSIP-B. If NO, then reconfigure the antenna-port mapping in CSIP-B as the antenna-port mapping preceding CSIP-A.

In the following, a more elaborated example procedure will be summarized. Assume that the procedure is initiated and have been executed for a number of steps where process A has a wider beamform than process B, then:

If in process A, the same beamform is suggested in the current step as in the previous step, and process B is reported to provide better performance than process A (via the CQI for instance), then use the beamform of process B to create two new narrower ports pointing in its direction (direction of the current beamform of process B). We can let process A change the antenna-port mapping to use these new ports and keep process B configured as is.

If in process A, the same beamform is suggested in the current step as in the previous step, and process B is reported to provide worse performance (e.g. CQI) than process A, then zoom out and let process B change its configuration (antenna-to-port mapping) to be wider than the active configuration in process A. Keep process A configured as is.

If in process A, a new beamform is suggested in the current step relative to the previous step, let process B change antenna-port mapping such that the new ports are pointing in the direction of the new beamform of process A.

The procedure may be translated into a tree-structure where the root node will have the same number of branches as the cardinality of the initial precoding codebook, for instance. The leaves of the tree will correspond to the finest beamforming possible and the tree-depth is limited by the number of antenna elements. In case a lower level node (representing narrower beamforming) in the tree is worse than the higher level node (representing wider beamforming), the lower level CSI process will dynamically change its antenna-port mappings such that it becomes the parent node of the other process. By doing this, the procedure will not only traverse downwards the tree (effectively zooming in), but also upwards (effectively zooming out) in order to capture bad choices made down the tree. This enables the procedure to reach a steady state in the middle of the tree if the best performance point is found there.

If more than two CSI processes are used, then the extra process(es) could be utilized to optimize the tree search further and allow the procedure to adapt much faster to the feedback reports.

As already described, the proposed technology may also be applied for one and the same feedback process. An initial antenna-port mapping may be assumed and reference signal(s) may be transmitted using the resulting beamforming configuration to enable a feedback report including feedback information such as PMI and CQI. The PMI may be used to reconfigure the antenna-port mapping and reference signal(s) may be transmitted using the resulting narrower beamforming configuration to enable yet another feedback report including feedback information such as PMI and CQI. If the most recent CQI is better than the previous CQI, the narrower beam form is likely more appropriate. The PMI of the beamforming configuration having the best CQI is therefore likely the best to use for determining a new beamforming configuration including a new antenna-port mapping. The procedure can then be repeated, obtaining feedback information and determining new beamforming configuration. If it is determined that a narrower beam form is worse than a wider, then it is possible to back off and zoom-out. In this particular example embodiment, CQI values are compared to determine which configuration is the best, and the corresponding PMI value is then used for determining a new beamforming configuration including a new antenna-port mapping.

Figure 14A:
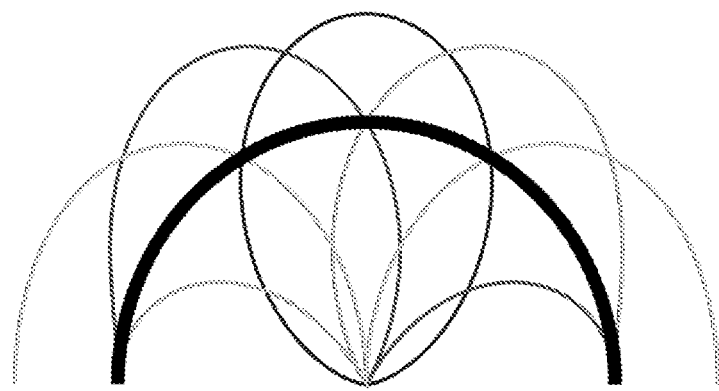
FIGS. 14A-C are schematic diagrams illustrating examples of antenna diagrams based on simulations according to an embodiment.
Figure 14B:
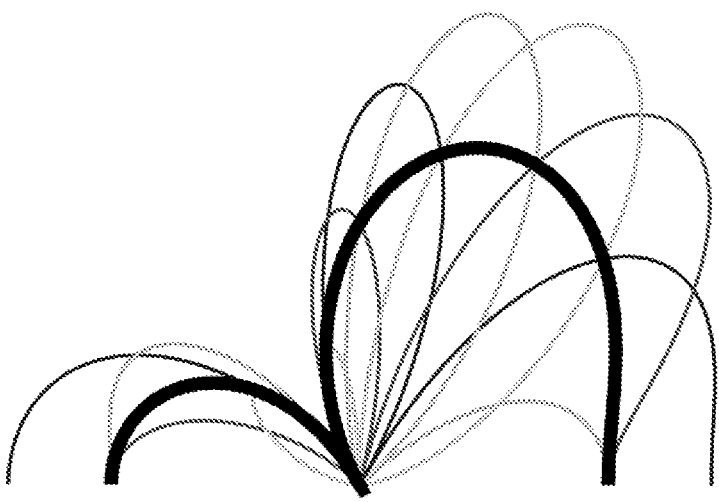
Figure 14C:
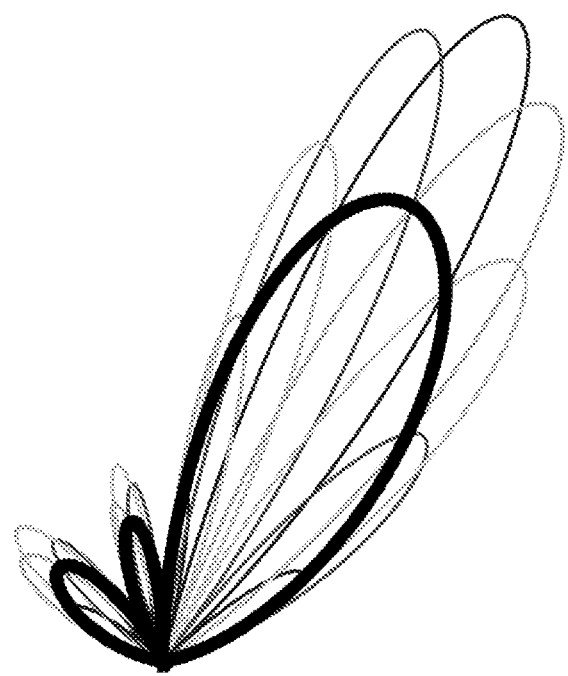

FIGS. 14A-C are schematic diagrams illustrating examples of antenna diagrams based on simulations according to an embodiment.

In this example, the simulation setup consists of 16 antenna elements (isotropic) on a horizontal line, half a wavelength apart. In FIG. 14A, two antenna ports have been setup, each having only one antenna element active. The thicker line illustrates the antenna diagram of those two antenna ports. As they have the same antenna pattern, they are aligned. The thinner lines show the resulting antenna diagrams with the possible beam forms that can be reported by PMI for two antenna ports and one layer. There are four such beam forms in one of the options of the current LTE standard, which is the reason why there are four thinner optional antenna diagrams (beams). As can be seen, they span the coverage of the isotropic antennas but with energy directed in different directions. Assume that the UE is located within one of the beams, and thus reports that that particular beam form is best suited, the data going through this choice of beam form will then experience an increased beamforming gain compared to what the previously antenna-port mappings provided, which were not beam-formed.

Let $[0 v_1] \in \mathbb{C}^{N_T}$ be one of the two new antenna ports, where $v_1 \in \mathbb{C}^2$ is the chosen beamforming vector. The first new antenna port has now two antenna elements active (the rest are set to zero). By letting the other antenna-port mapping be $[v_1 0] \in \mathbb{C}^{N_T}$, both antenna-port mappings will have the same directivity (beamform) and the same number of antenna elements active, just not exactly the same elements active. This means that they will both have the exact same antenna-pattern but with a slight shift as the active antennas are physically apart. The new ports will have the thick antenna diagram according to FIG. 14B. The thinner shapes in FIG. 14B are the resulting beamforming vectors which can be reported by PMI with today's LTE. Once again, these new beamforms span the same angle as the antenna-ports, but also provide an extra gain in power.

Assume now that one of the beam forms illustrated with thinner lines is chosen. Define the new antenna ports, as before, by activating two times more antenna elements and not letting the same, but different elements being active for the two different antenna-port mappings. This results in FIG. 14C, and note again that this is done by using beamforming vectors that are already available in LTE. By performing this in yet another step results in new antenna-port mappings and beamforming alternatives, where all 16 elements are active and hence the full beamforming capability is utilized.

This example shows that by using very little signaling, one can achieve the performance of a beamforming codebook with a granularity of 256 different beamformers and 16 antenna elements. For 8 antenna elements (FIG. 14C), the effective granularity would be 64. By comparing this procedure with that of today's LTE with 8 antenna-elements setup whose beamforming codebooks have a granularity of 16, the potential advantages are substantial. The codebook used in this example can be found in Table 6.3.4.2.3-1 in 3GPP 36.211. In addition, only two antenna ports were used which means that each UE does not occupy as many CSI-RS elements as today with four or eight antenna elements.

By way of example, the proposed technology can be used to increase the granularity of the beamforming in an iterative and dynamic manner. As described herein, a particular embodiment is based on a feedback loop where the UE reports back to the base station (BS) a number of bits that indicate how to improve previously used beamformer(s) in order to achieve finer beamforming granularity. This can be done with a fixed number of antenna ports where the port-to-antenna mappings are changed dynamically. By performing the procedure iteratively in several steps, the overhead of the reference signaling can be kept fixed and small.

Advantages include at least one of high throughput, low feedback overhead, and high robustness against channel estimation errors. In a particular embodiment, the advantages include adaptive high beamforming gain at a low overhead cost and with better granularity compared to the prior art.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides an apparatus configured to determine a beamforming configuration for a multi-antenna system having at least two antennas and having a port-to-antenna mapping between antenna ports and antennas. The apparatus is configured to obtain first feedback information originating from a wireless device relating to a multi-antenna transmission based on a first beamforming configuration enabling beamforming according to a first beam form, wherein the first beamforming configuration includes a first port-to-antenna mapping. The apparatus is also configured to obtain second feedback information originating from the wireless device relating to a multi-antenna transmission based on a second, different beamforming configuration enabling beamforming according to a second, different beam form, wherein the second beamforming configuration includes a second, different port-to-antenna mapping. The apparatus is further configured to determine, based on the first feedback information and the second feedback information, a third beamforming configuration for the multi-antenna system including a third port-to-antenna mapping to enable beamforming according to a third beam form.

By way of example, the apparatus may be configured to determine the third beamforming configuration such that the third beam form has a beam width that differs from the beam widths of at least one of the first beam form and the second beam form and/or a beamforming direction that differs from the beamforming direction of at least one of the first beam form and the second beam form. As an example, the apparatus may be configured to determine the third beamforming configuration such that the third beam form is at least partly overlapping with respect to at least one of the first beam form and the second beam form.

For example, the apparatus may be configured to obtain first channel quality information and/or first precoding information as part of the first feedback information, and second channel quality information and/or second precoding information as part of the second feedback information.

In a particular embodiment, the apparatus is configured to determine the third beamforming configuration based on a comparison of the first channel quality information and the second channel quality information.

Optionally, the apparatus is configured to determine the third beamforming configuration based on at least one of the first precoding information and the second precoding information.

Figure 15:
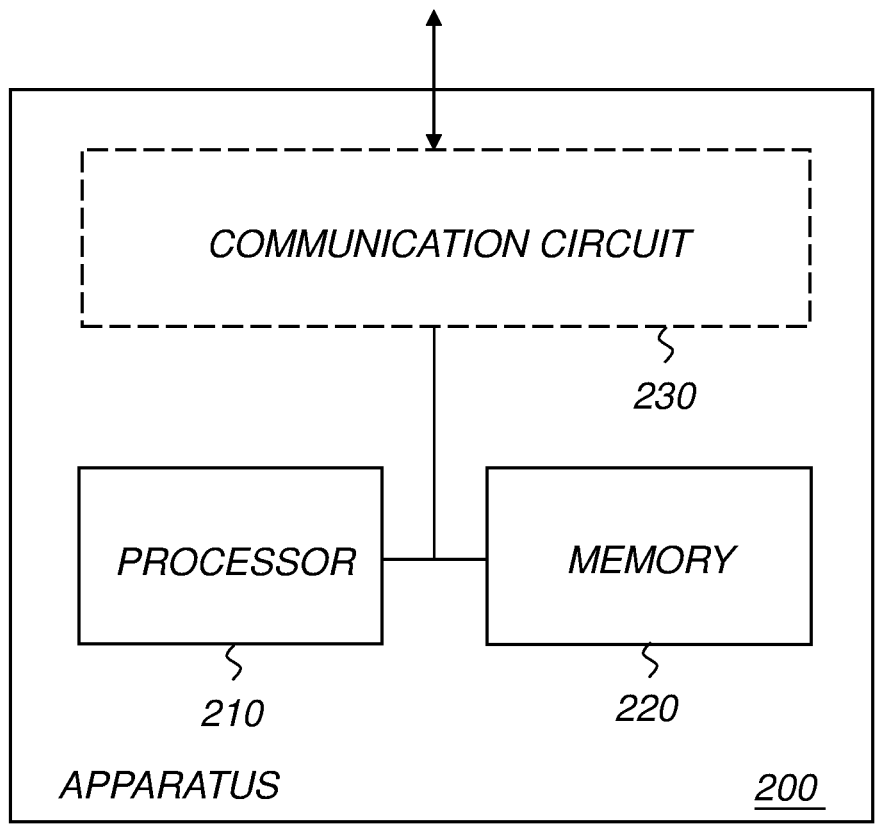
FIG. 15 is a schematic block diagram illustrating an example of an apparatus according to an embodiment.

FIG. 15 is a schematic block diagram illustrating an example of an apparatus according to an embodiment. In this particular example, the apparatus 200 comprises a processor 210 and a memory 220, said memory comprising instructions executable by the processor, whereby the processor is operative to determine a beamforming configuration for a multi-antenna system.

Optionally, the apparatus 200 may also include a communication circuit 230. The communication circuit 230 may include functions for wired and/or wireless communication with other devices and/or network nodes in the network. In a particular example, the apparatus may include radio circuitry for communication with one or more other nodes, including transmitting and/or receiving information. The communication circuit 230 may be interconnected to the processor 210 and/or memory 220.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Figure 16:
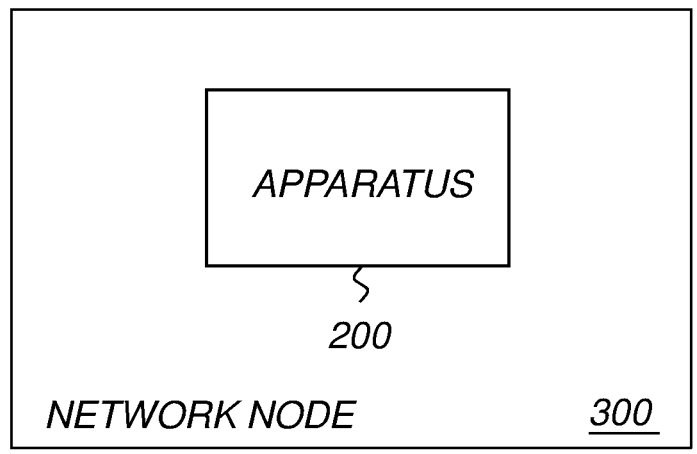
FIG. 16 is a schematic block diagram illustrating an example of a network node comprising an apparatus according to an embodiment.

FIG. 16 is a schematic block diagram illustrating an example of a network node comprising an apparatus according to an embodiment. The network node 300 includes an apparatus 200 as described herein. For example, the network node 300 may be a radio base station such as an eNodeB or any other suitable base station.

Figure 17:
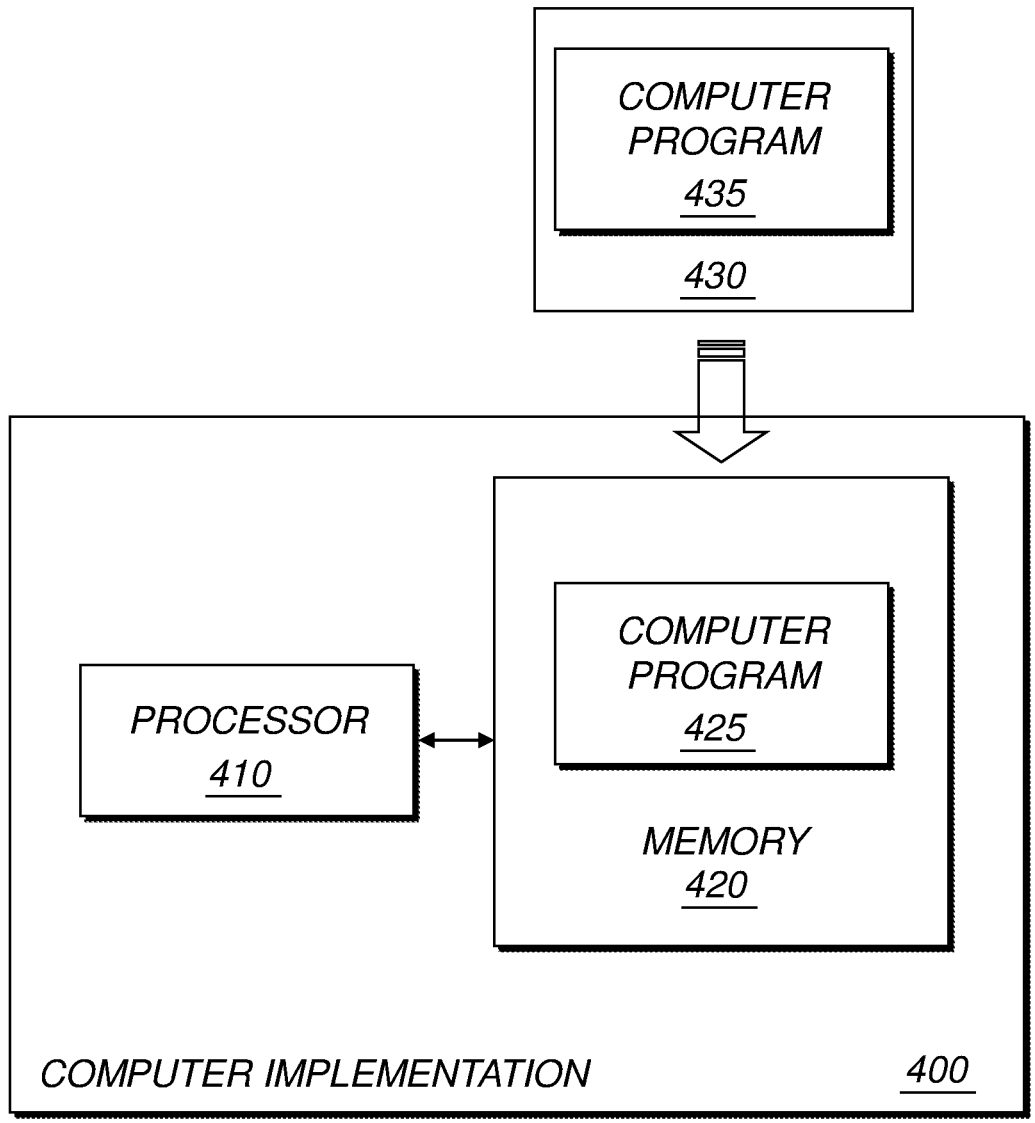
FIG. 17 is a schematic block diagram illustrating an example of a computer-implementation of the proposed technology according to an embodiment.

FIG. 17 is a schematic block diagram illustrating an example of a computer-implementation of the proposed technology according to an embodiment.

In this particular example, referring to the schematic example illustrated in FIG. 17, at least some of the steps, functions, procedures, modules and/or blocks described herein are implemented in a computer program 425; 435, which is loaded into the memory 420 for execution by processing circuitry including one or more processors 410. The processor(s) 410 and memory 420 of this computer-implementation 400 are interconnected to each other to enable normal software execution. An optional input/output device may also be interconnected to the processor(s) and/or the memory to enable input and/or output of relevant data such as input parameter(s) and/or resulting output parameter(s).

Figure 18:
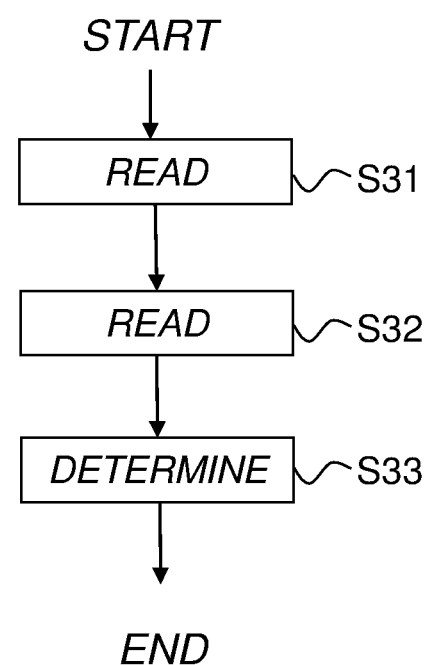
FIG. 18 is a schematic computer flow diagram according to an embodiment.

FIG. 18 is a schematic computer flow diagram according to an embodiment.

In a particular embodiment, there is provided a computer program for determining, when executed by at least one processor, a beamforming configuration for a multi-antenna system having at least two antennas and having a port-to-antenna mapping between antenna ports and antennas. The computer program comprises instructions, which when executed by said at least one processor, cause the at least one processor to:

S31: read first feedback information originating from a wireless device relating to a multi-antenna transmission based on a first beamforming configuration enabling beamforming according to a first beam form, wherein the first beamforming configuration includes a first port-to-antenna mapping;

S32: read second feedback information originating from the wireless device relating to a multi-antenna transmission based on a second, different beamforming configuration enabling beamforming according to a second, different beam form, wherein the second beamforming configuration includes a second, different port-to-antenna mapping;

S33: determine, based on the first feedback information and the second feedback information, a third beamforming configuration for the multi-antenna system including a third port-to-antenna mapping to enable beamforming according to a third beam form.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In particular, there is provided a computer program product comprising a computer-readable medium 420; 430 having stored thereon a computer program 425; 435 as described herein.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor. Hence, the apparatus may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 19.

Figure 19:
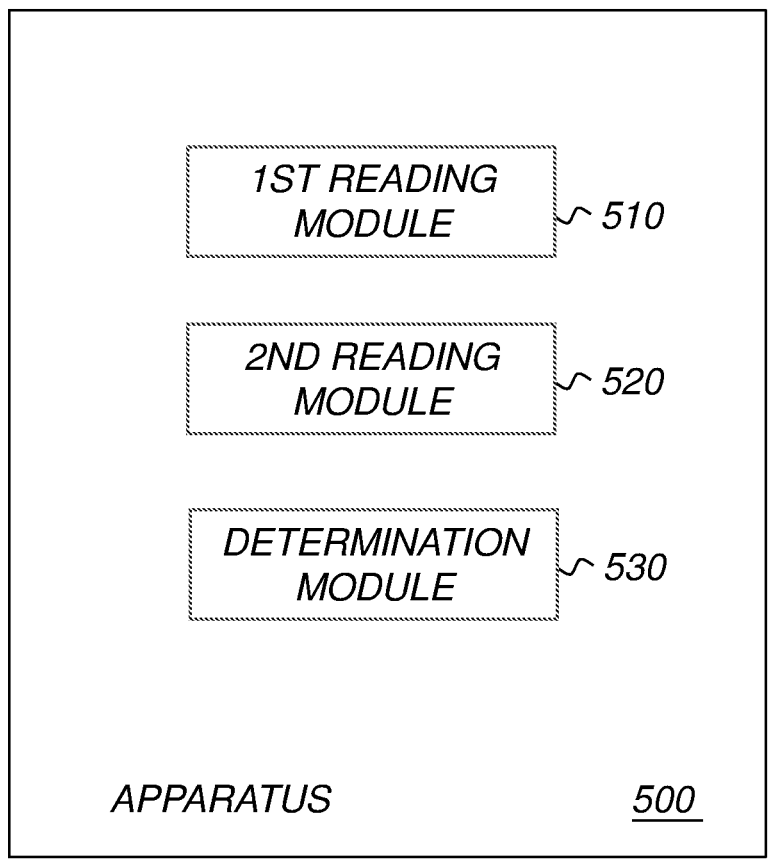
FIG. 19 is a schematic block diagram illustrating an example of an apparatus for determining a beamforming configuration for a multi-antenna system.

FIG. 19 is a schematic block diagram illustrating an example of an apparatus for determining a beamforming configuration for a multi-antenna system. The apparatus comprises:

a first reading module 510 for reading first feedback information originating from a wireless device relating to a multi-antenna transmission based on a first beamforming configuration enabling beamforming according to a first beam form, wherein the first beamforming configuration includes a first port-to-antenna mapping;

a second reading module 520 for reading second feedback information originating from the wireless device relating to a multi-antenna transmission based on a second, different beamforming configuration enabling beamforming according to a second, different beam form, wherein the second beamforming configuration includes a second, different port-to-antenna mapping;

a determination module 530 for determining, based on the first feedback information and the second feedback information, a third beamforming configuration for the multi-antenna system including a third port-to-antenna mapping to enable beamforming according to a third beam form.

Alternatively it is possibly to realize the modules in FIG. 19 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] *Hierarchical Beamforming for Large One-Dimensional Wireless Networks* by Merzakreeva et al. in 2012 IEEE International Symposium on Information Theory Proceedings (ISIT), pp. 1533-1537, 1-6 Jul. 2012.

[2] WO 2013/133645 A1.

The invention claimed is:

1. A method for determining a beamforming configuration for a multi-antenna system having at least two antennas and having a port-to-antenna mapping between antenna ports and antennas, wherein the method comprises:

obtaining first feedback information originating from a wireless device relating to a multi-antenna transmission based on a first beamforming configuration enabling beamforming according to a first beam form, wherein the first beamforming configuration includes a first port-to-antenna mapping;

obtaining second feedback information originating from the wireless device relating to a multi-antenna transmission based on a second, different beamforming configuration enabling beamforming according to a second, different beam form, wherein the second beamforming configuration includes a second, different port-to-antenna mapping; and determining, based on the first feedback information and the second feedback information, a third beamforming configuration for the multi-antenna system including a third port-to-antenna mapping to enable beamforming according to a third beam form, wherein the first feedback information and the second feedback information belong to different feedback processes, wherein the method further comprises transferring information about the determined third beamforming configuration to a network node for enabling multi-antenna transmission of at least one reference signal based on the determined third beamforming configuration.

2. The method of claim 1, wherein the third beamforming configuration is determined such that the third beam form has a beam width that differs from the beam widths of at least one of the first beam form and the second beam form and/or a beamforming direction that differs from the beamforming direction of at least one of the first beam form and the second beam form.

3. The method of claim 1, wherein the third beamforming configuration is determined such that the third beam form is at least partly overlapping with respect to at least one of the first beam form and the second beam form.

4. The method of claim 1, further comprising performing multi-antenna transmission of at least one reference signal based on the determined third beamforming configuration.

5. The method of claim 1, further comprising:

performing, based on the first beamforming configuration, multi-antenna transmission of at least one reference signal according to the first beam form to enable obtaining the first feedback information;

performing, based on the second beamforming configuration, multi-antenna transmission of at least one reference signal according to the second beam form to enable obtaining the second feedback information; and wherein the first beam form and the second beam form have different beam widths.

6. The method of claim 1, wherein the first feedback information includes first channel quality information and/or first precoding information, and the second feedback information includes second channel quality information and/or second precoding information.

7. The method of claim 6, wherein the third beamforming configuration is determined based on a comparison of the first channel quality information and the second channel quality information.

8. The method of claim 6, wherein the third beamforming configuration is determined based on at least one of the first precoding information and the second precoding information.

9. The method of claim 6, wherein the third beamforming configuration is determined, if the first beam form is wider than the second beam form and the first channel quality information is more than an offset better than the second channel quality information, such that the third beam form is wider than the second beam form.

10. The method of claim 6, wherein the third beamforming configuration is determined, if the first beam form is wider than the second beam form and the second channel quality information is more than an offset better than the first channel quality information, such that the third beam form is narrower than the first beam form.

11. The method of claim 1, wherein the first feedback information and the second feedback information belong to the same feedback process and are obtained at different time instances.

12. The method of claim 11, wherein the feedback process is a Channel State Information (CSI) process associated with a reference signal configuration for multi-antenna transmission based on a beamforming configuration to enable feedback from the wireless device.

13. The method of claim 1, wherein the different feedback processes are Channel State Information (CSI) processes, each CSI process being associated with a reference signal configuration for multi-antenna transmission based on a beamforming configuration to enable feedback from the wireless device.

14. The method of claim 1, further comprising the steps of:
obtaining additional feedback information from a wireless device relating to a multi-antenna transmission based on the determined beamforming configuration, and
determining, based on the additional feedback information and at least one of the previously obtained feedback information, yet another beamforming configuration for said multi-antenna system.

15. The method of claim 14, wherein the steps of obtaining additional feedback information and determining yet another updated beamforming configuration for said multi-antenna system are iteratively performed.

16. The method of claim 1, wherein the port-to-antenna mapping of the multi-antenna system defines how a signal input to at least one antenna port is transmitted through a set of one or more physical antennas.

17. An apparatus configured to determine a beamforming configuration for a multi-antenna system having at least two antennas and having a port-to-antenna mapping between antenna ports and antennas, the apparatus comprising a communication circuit, a processor operatively coupled to the communication circuit, and a memory operatively coupled to the processor, wherein the memory stores instructions for execution by the processor whereby the apparatus is configured to:
obtain first feedback information originating from a wireless device relating to a multi-antenna transmission based on a first beamforming configuration enabling beamforming according to a first beam form, wherein the first beamforming configuration includes a first port-to-antenna mapping;
obtain second feedback information originating from the wireless device relating to a multi-antenna transmission based on a second, different beamforming configuration enabling beamforming according to a second, different beam form, wherein the second beamforming configuration includes a second, different port-to-antenna mapping;
determine, based on the first feedback information and the second feedback information, a third beamforming configuration for the multi-antenna system including a third port-to-antenna mapping to enable beamforming according to a third beam form,
obtain first channel quality information and/or first precoding information as part of the first feedback information, and second channel quality information and/or second precoding information as part of the second feedback information; and
determine the third beamforming configuration based on a comparison of the first channel quality information and the second channel quality information.

18. The apparatus of claim 17, wherein the memory stores instructions for execution by the processor whereby the apparatus is configured to determine the third beamforming configuration such that the third beam form has a beam width that differs from the beam widths of at least one of the first beam form and the second beam form and/or a beamforming direction that differs from the beamforming direction of at least one of the first beam form and the second beam form.

19. The apparatus of claim 17, wherein the memory stores instructions for execution by the processor whereby the apparatus is configured to determine the third beamforming configuration such that the third beam form is at least partly overlapping with respect to at least one of the first beam form and the second beam form.

20. The apparatus of claim 17, wherein the memory stores instructions for execution by the processor whereby the apparatus is configured to determine the third beamforming configuration based on at least one of the first precoding information and the second precoding information.

21. A network node comprising an apparatus configured to determine a beamforming configuration according to claim 17.

22. The network node of claim 21, wherein the network node is a radio base station.

23. A non-transitory computer-readable medium comprising, stored thereupon, a computer program for determining, when executed by at least one processor, a beamforming configuration for a multi-antenna system having at least two antennas and having a port-to-antenna mapping between antenna ports and antennas, wherein the computer program comprises instructions that, when executed by said at least one processor, cause the at least one processor to:
read first feedback information originating from a wireless device relating to a multi-antenna transmission based on a first beamforming configuration enabling beamforming according to a first beam form, wherein the first beamforming configuration includes a first port-to-antenna mapping;
read second feedback information originating from the wireless device relating to a multi-antenna transmission based on a second, different beamforming configuration enabling beamforming according to a second, different beam form, wherein the second beamforming configuration includes a second, different port-to-antenna mapping;
determine, based on the first feedback information and the second feedback information, a third beamforming configuration for the multi-antenna system including a third port-to-antenna mapping to enable beamforming according to a third beam form; and transfer information about the determined third beamforming configuration to a network node for enabling multi-antenna transmission of at least one reference signal based on the determined third beamforming configuration.

\* \* \* \* \*